(12) United States Patent
Ebert et al.

(10) Patent No.: US 7,398,056 B1
(45) Date of Patent: *Jul. 8, 2008

(54) CHANNEL ESTIMATION APPLIQUE FOR MULTIPLE ANTENNA WIRELESS COMMUNICATIONS

(75) Inventors: Paul Michael Ebert, Potomac, MD (US); Donald Stuart Arnstein, Fairfax, VA (US)

(73) Assignee: Saraband Wireless, Inc, Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/451,392

(22) Filed: Jun. 13, 2006

(51) Int. Cl.
*H04B 17/00* (2006.01)
(52) U.S. Cl. ............... 455/67.14; 455/67.11; 455/67.16; 455/42
(58) Field of Classification Search ............. 455/67.14, 455/67.16, 67.11, 71, 42, 23
See application file for complete search history.

(56) References Cited

U.S. PATENT DOCUMENTS

| 6,157,183 | A | * | 12/2000 | Bradley | 324/76.23 |
| 6,225,941 | B1 | * | 5/2001 | Gogineni et al. | 342/22 |
| 7,155,171 | B2 | * | 12/2006 | Ebert et al. | 455/67.14 |

* cited by examiner

*Primary Examiner*—Matthew Anderson
*Assistant Examiner*—Eugene Yun

(57) ABSTRACT

Multiple antenna wireless communication systems require accurate knowledge of the transfer function between all paths. This invention discloses a system wherein a test signal generator at a transmitter station and a facsimile generator at a receiver station go through an acquisition and tracking process which aligns the two signals, removing errors in the time base of generation, the frequency offset of generation and the time of arrival, so that a logical processor can compute the frequency transfer function of propagation pathways between the multiple input and multiple output antennas. In turn, these channel measurements are used in an adaptive, concurrently sent communication signal. The frequency transfer functions are conveyed back to the transmit end via a control channel permitting an adaptivity function at the transmit end to influence subsequent selection of communication parameters, among which are typically transmitted data rate, selection of modulation, selection of forward error correcting coding, and selection of frequency band for transmission. The same measurement is conveyed to an adaptivity function at the receive end for use in the communications receiver to select signal combining variables such as gain control, and equalization of amplitude and phase, versus frequency. An alternate embodiment invention of this type is described which is additionally useful for mobile multiple antenna communications channels. Another variation embodiment is described for pure propagation measurements only, absent conveyance of end-user information.

20 Claims, 18 Drawing Sheets

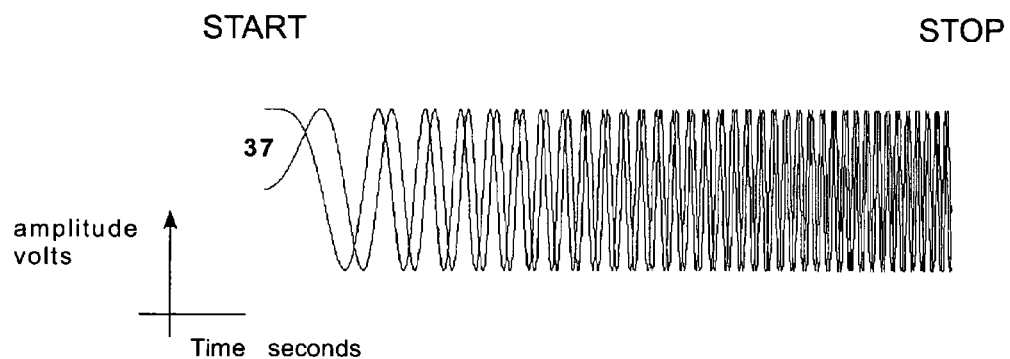
(a) Time Domain Plot of Linear FM Sweep In-Phase and Quadratur
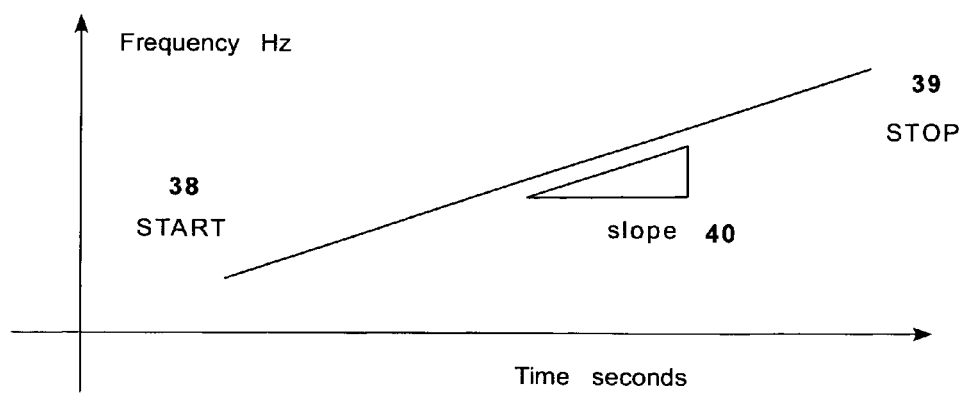
(b) Frequency Domain Plot of Linear FM Sweep
Fig 2

Control Parameters in the Facsimile
Preferred Embodiment

Figure 1:
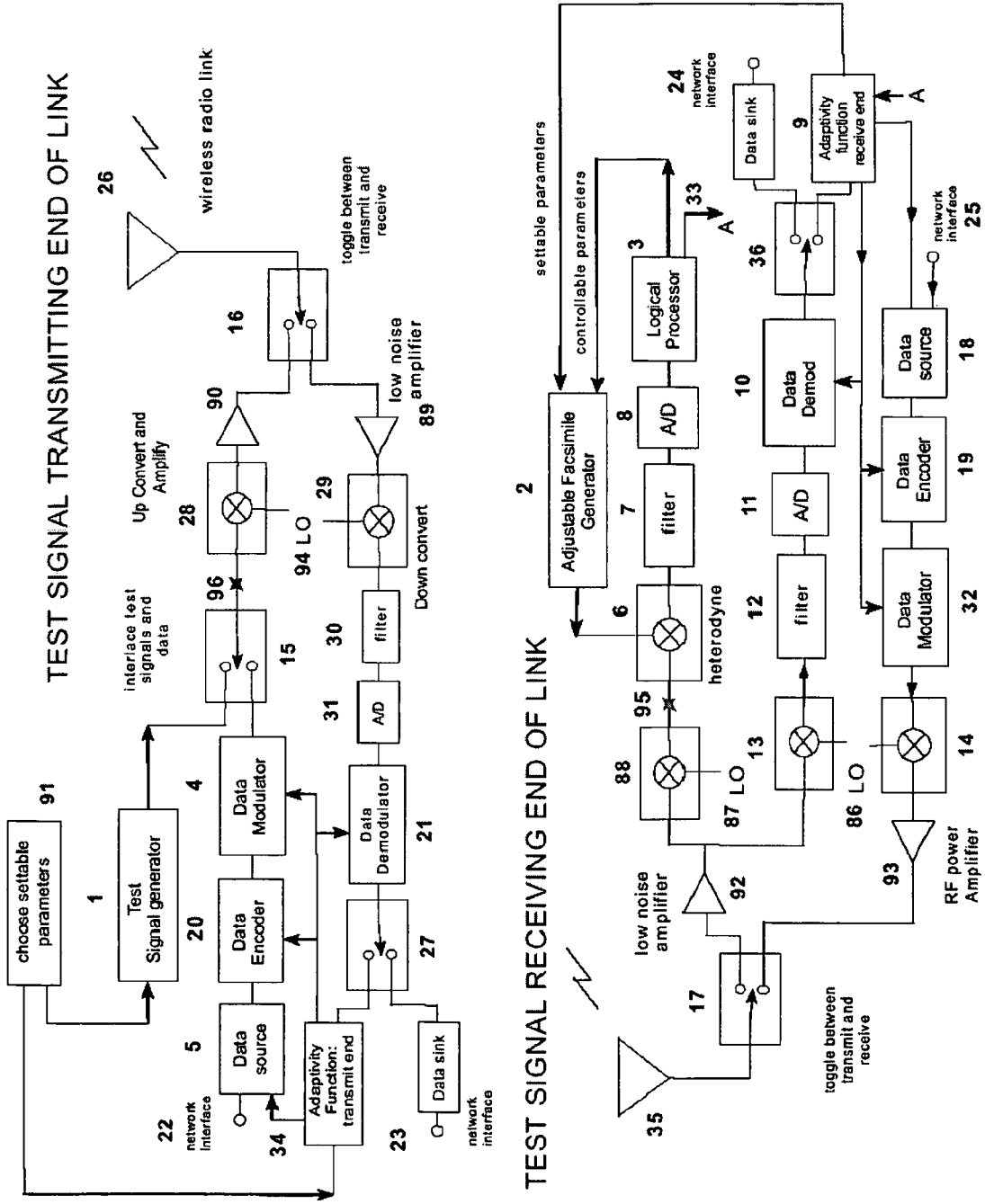

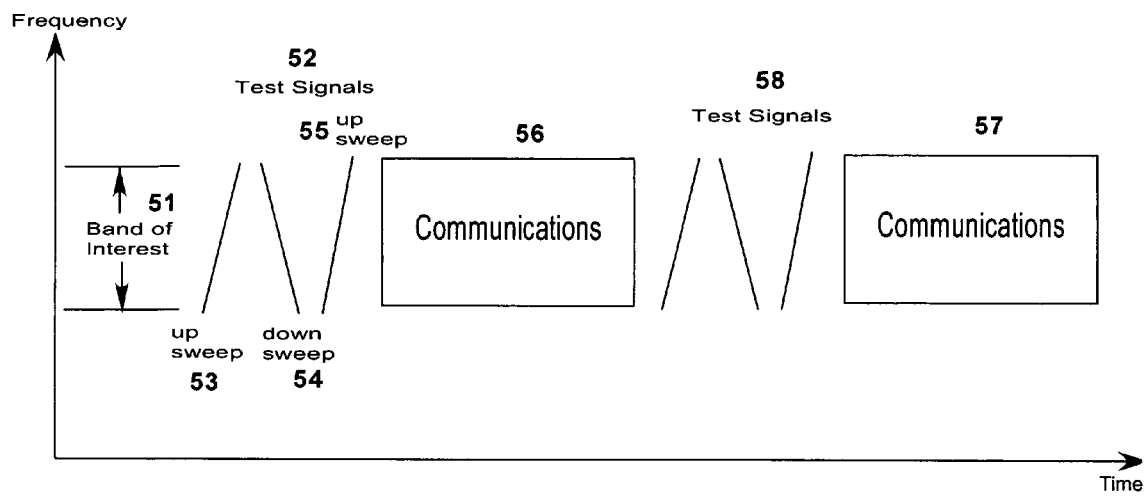
Figure 5(a)  Preferred Embodiment Example 1 variation
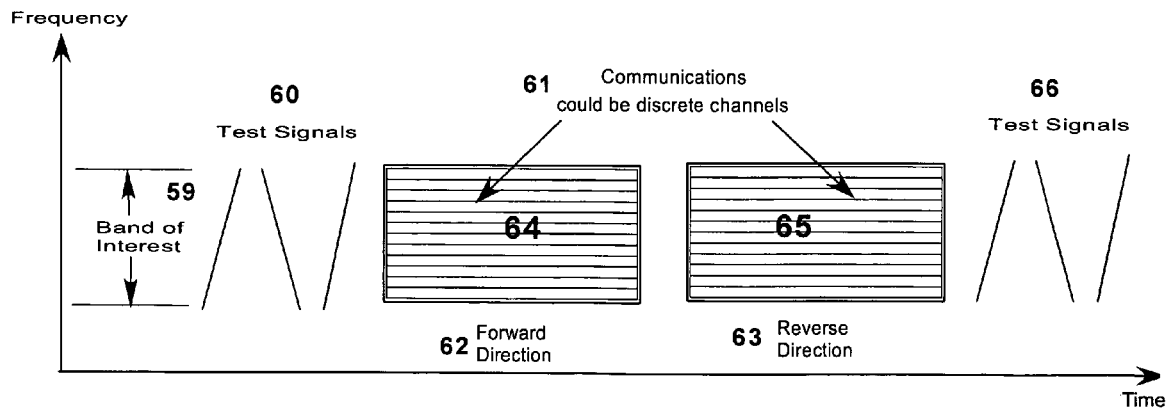
Figure 5(b)  Preferred Embodiment Example 2 variation differences exaggerated for clarity
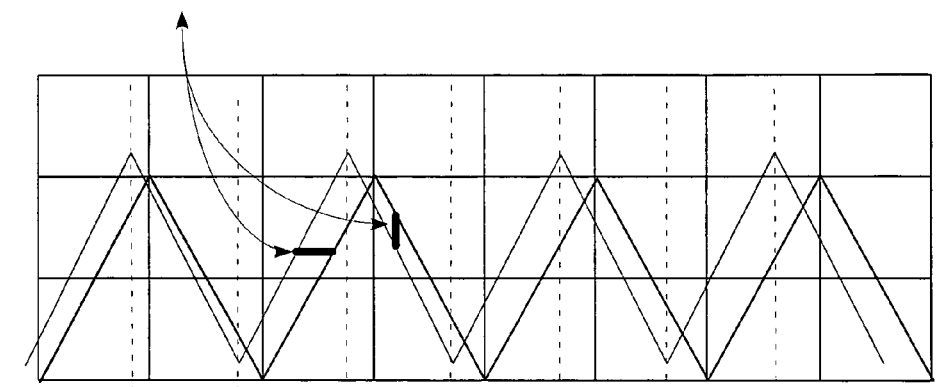
Heterodyned signal is beat frequency between received test signal and facsimile test signal
difference frequency
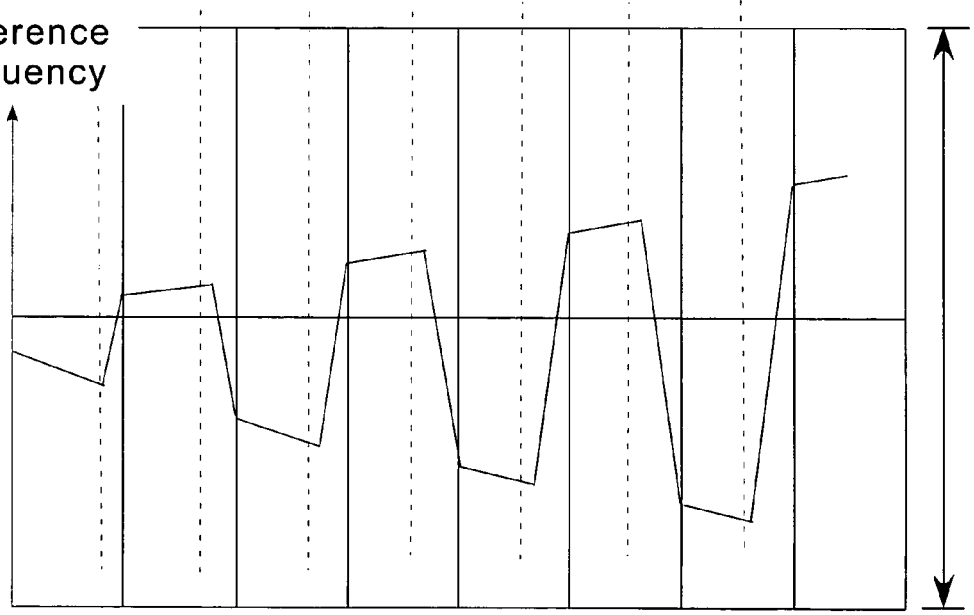
Heterodyned signal stays within band of filter preceding A/D converter [filter 7 in Figure 1]
Fig 8 free running at start up (a) Incoming and locally generated signals running at the same speed: produces very short pulses out of baseband filter (b) Locally generated signal running fast

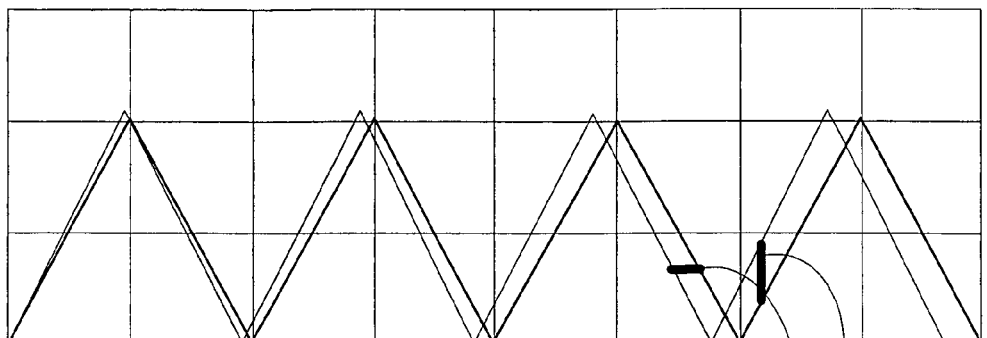
(a) Error in oscillator Offset Δf/f
errors exaggerated for clarity
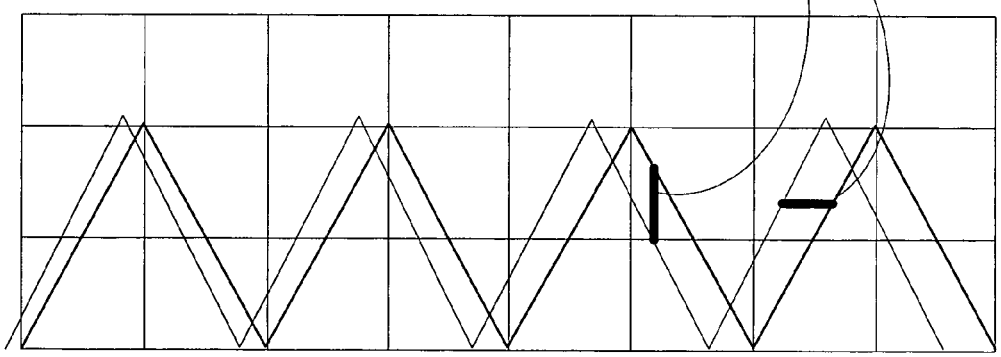
(b) Add Error in time sync $\tau_\varepsilon$
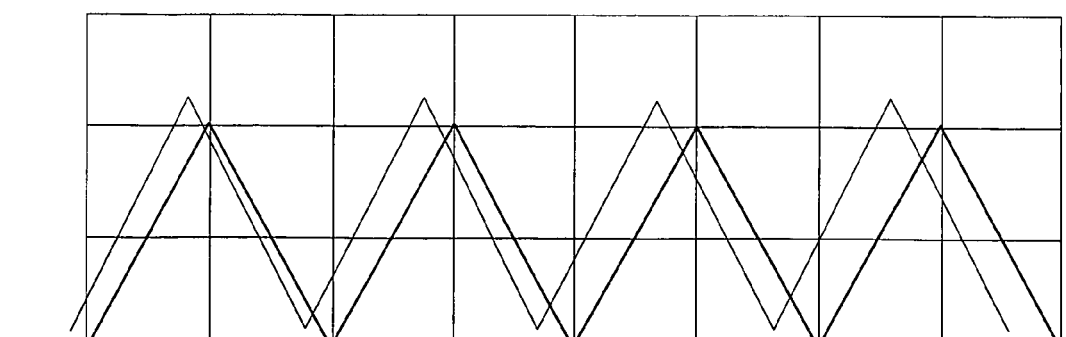
(c) Add Error in Frequency Conversion $f_\varepsilon$
Fig 13 (a), (b), and (c)

CHANNEL ESTIMATION APPLIQUE FOR MULTIPLE ANTENNA WIRELESS COMMUNICATIONS

This application claims the benefit of a prior Non-Provisional patent application Ser. No. 10/280,595, filing date Oct. 25, 2002, Confirmation Number 8339, Art Unit 2682, Examiner Eugene Yun.

FEDERALLY SPONSORED RESEARCH not applicable

SEQUENCE LISTING OR PROGRAM not applicable

BACKGROUND OF THE INVENTION

1. Field of the Invention*

* All classes and subclasses listed in this section were obtained by searching the USPO web site. Most recent search: October 2002.

The present invention relates generally to a wireless communication channel and more particularly to a channel measurement technique that is employed concurrent with communications.

The invention combines a novel way to realize a vector network analyzer (class 324/subclass 615, 607, 606) and a communications link, the former operating concurrent with the latter, in such a way that information about the channel behavior is supplied directly and expeditiously to an adaptivity function associated with operating the communication link over a fading channel.

Examples of adaptivity aided by this invention are, adjusting the data rate, center frequency, type of modulation, bits per second, and forward error correcting coding.

Another adaptivity function is channel equalization (class 708/subclass 323). Prior art for equalization uses one or more of these methods: preambles, training sequences, embedded pilot tones, received and use of data-aided equalization (375/subclass 229, 232). With our invention, these equalization preambles, training sequences and pilot tones can be eliminated because the new vector network analyzer (VNA) produces the information needed to derive the correct equalizer, and does it better and faster than preambles, etc., with much less overhead.

Wireless unlicensed band communication and higher-powered licensed band communication are examples of fading channels (class 455/subclass 506). What is remarkable about our invention is that the fading channel being tested by the VNA is the entire propagation path, with the ends separated by hundreds of meters to tens of kilometers. Our invention is a breakthrough in the state of the art because it frees up the VNA from being merely a single piece of test equipment. Based on discoveries made concerning the elimination of artifacts, our invention allows a VNA to be distributed over very long propagation paths typical of wireless communications.

The resulting tight synergistic coupling of channel measurement with channel usage is not possible by any other means and can lead to the design of more efficient high speed channels for broadband communications.

Because the invention involves time interlacing of short measurement waveforms along with communications signals, this invention also has some resemblance to channel sounders (455/67.4) used both in pure research and in certain types of communications like meteor burst and HF communications. Taking meteor burst as a prior art example, channel sounding is fairly crude in the sense that it is a GO/NO-GO type of test, either there is a meteor trail or there isn't. Our invention sends precisely calibrated test signals time interlaced in an unobtrusive manner with communications. Some of the prior art channel sounders can measure amplitude versus frequency but cannot measure phase shift versus frequency as this invention can. Phase shift versus frequency is crucial to understanding the multipath behavior of the channel which, in turn, leads to a multiplicity of adaptivity options not available by other means.

The following Table 1 summarizes the field of the invention by reference to class and subclass categories as recently defined by the U.S. Patent Office.

TABLE 1

Representative Prior Art: Categories Close to This Invention

| Class | Class Title | Subclass | Subclass Title |
|---|---|---|---|
| 375 | Pulse or Digital Communications | 229 | Equalizers |
| | | 231 | Calibration of automatic equalizers |
| | | 224 | Testing |
| | | 232 | Equalizers with adjustable taps |
| | | 240.02 | Adaptive coding depending on signal |
| 324 | Electrical Measuring Devices | 615 | Transfer Function Type Characteristic |
| | | 607 | Including A/D Converters |
| | | 606 | Including Signal Comparison Circuit |
| 455 | Telecommunications | 500 | Plural transmitters or receivers |
| | | 504 | Fading Compensation |
| | | 506 | Rayleigh or Multipath Fading Diversity Combining |
| | | 505 | Due to Weather |
| | | 515 | Control Channel Monitoring |
| | | 65 | Anti-Multipath |
| | | 67.4 | Using a Test Signal |
| | | 67.6 | Phase Measuring |
| 708 | Electrical Computers: Arithmetic Processing and Calculating | 300 | Filters |
| | | 323 | Equalizers |

2. Description of Related Art 2.1. Previous Efforts at Overcoming Fading

Broadband wireless access networks under 5 GHz are being planned in the U.S. to operate in licensed bands that permit high power transmission, for example the MMDS, the ITFS, or the WCS bands, in the U.S. These bands are characterized by diffraction-mode propagation[1,2] when the link is non-line of sight (NLOS). Diffraction is the phenomenon of waves bending around buildings and other obstacles such as foliage and rolling terrain. Attenuation also increases in a highly unpredictable manner in NLOS. In point-to-multipoint wireless networks there may be thousands of links which do not have a direct line-of-sight path between them and a central hub, each seeing a slightly different propagation path. Finally, whenever a subscriber has been off the air for some time it is necessary to recalibrate the link to account for minor changes such as weather conditions.

Under 5 GHz, where diffraction modes are significant[3,4,5,6,7], use of the band in a purely line of sight (LOS) mode would be wasteful of the spectrum and would require a large amount of tower infrastructure. On the other hand, worst-case designs into the outer reaches of NLOS operation based on long-term statistical models of links, is also wasteful. Statistical models do not lead to results that scale into the network capacities needed for commercial viability of wireless Internet systems.

The use of low power Industrial Scientific and Medicine (ISM) bands for broadband wireless access (BWA), while making the bands readily available without cost, would also require heavy infrastructure buildouts[8].

Since most broadband applications today are two-way, the measurement should apply to both directions, adding to the complexity of improving performance over this type of link. The following is a summary of various prior art adaptivity techniques which have been contemplated for overcoming the effect of fading in wireless channels.

(a) Adaptation Through Use of Handshake Signals

Traditionally, wire line modems adapt to the physical medium by means of a start-up protocol which consists of trial messages, answering handshakes, and modulation fallback[9][10]. The two modems agree on a stable data rate and then begin information transfer. Wireless channels in diffraction mode change too fast for this method to ever reach equilibrium so another method is needed which works quickly and unambiguously to define the channel's capability.

(b) Handbook-Based Designs for Fading Channels

As a design approach, handbook-based channel models are a holdover from microwave radio relay fixed point-to-point links[11]. These are typically oversized by 20 dB to 30 dB to yield very high availability over the course of one year. The use of statistical channel models also finds use for mobile wireless telephony where doppler rates to a moving vehicle are high and predictability of the fine-grained channel structure in real time is nearly impossible[12].

A number of models have been developed to enable engineering design to take place on a simulation basis and on a worst-case basis. Examples of these models are, Okamura, Longley-Rice, Egli, and Carey[13], the Ricean K-Factor model[14], and the Rayleigh fading model[15]. However, reliance on handbook-based channel models for guessing what broadband wireless channel characteristics are going to be, especially when those models are more appropriate to narrow band mobile environments[16], is not a good idea.

(c) Embedded Pilot Tones Used to Adapt to Fading Channels

Yet another approach for training a receiver to deal with propagation conditions is the use of embedded pilot tones, specifically recommended in the literature for orthogonal frequency division multiplexing (OFDM)[17], a modulation technique being considered by standards groups specifically for use with broadband wireless non-line-of-sight links. The literature has many examples of OFDM time-frequency occupancy plans in which certain slots are reserved for unmodulated pilot tones that step sequentially across the band[18][19][20].

The embedded pilot tone approach suffers from the following problem: its determination of the channel is necessarily after-the-fact. What happens if the channel quality turns out to be too poor to support the data rate contained in that particular packet? Logically, it would be better to know what the channel's capability is before selecting the modulation, FEC, data rate, center frequency, and so on. Pilot tones also take up a significant percentage of the useful information-bearing capacity in the packet.

The invention described here overcomes another serious problem associated with embedded pilot tones, a problem that is not well treated in prior art systems. Since pilot tones are located at specific frequencies, the resultant channel estimate is at best a sampled version of the frequency response of the channel. If these samples are too widely spaced, the frequency transfer function needs to be interpolated. Sometimes this interpolation works, other times it may not work, for example if the delay spread in the channel is large, there could be a lot of selective fading. To make the problem worse, large delay spread is associated with high powered licensed bands where distances go up to many kilometers.

(d) Preambles Used as Channel Sounders for Adaptivity

Yet another adaptivity mechanism for use on fading channels, in particular to assist in finding an equalizer, is the use of a known training sequence as a preamble (or in some cases a "midamble"[21]) to each packet. This approach is typically used in Single Channel (SC) operation where selective fading causes intersymbol interference (ISI)[22][23][24]. Just as with embedded pilot tones, the channel adjustment mechanism called into play takes place after modulation and data rate have been selected, and so is of questionable value as a way to adapt to fading channel conditions.

(e) Diversity and Multiple Antenna Assemblies

The use of diversity techniques dates back many decades to line-of-sight radio relay systems, to HF communications, and to troposcatter. More recently diversity, and multiple input-multiple output (MIMO) antenna assemblies in particular, have been suggested for use in broadband wireless systems. The inventors believe that there is a lot of promise to this approach. Familiar with the extensive literature on the topic, the inventors set out to understand what needs to be done to implement diversity. We found out that having precise knowledge of the channel on each diversity path is just the first step in designing a diversity system, but by no means a guarantee of success.

A simple example is switch diversity versus equal gain combining diversity. With switch diversity, the strongest of several channels is selected and used. With equal gain combining diversity, all channels are used simultaneously by coherently summing together signals from several antennas.

Which is better, switch diversity or equal gain combining? Surprisingly, it turns out that even if knowledge of the diversity channels is perfect and both combining schemes are done correctly, than equal gain combining may or may not be better than switch diversity, depending on the signal to noise ratio of each diversity channel. This apparent paradox points out the criticality of first, knowing the channel conditions, and second, using that knowledge correctly. These two topics, measurement and adaptivity, are the subject of this invention.

The inventors are familiar with all of these techniques, (a) through (e), and have followed discussions in various standards setting bodies concerning the need for adaptivity in broadband fading channels[25]. We are convinced that it is necessary to decouple channel measurement from communication, as this invention does, in order to have the most freedom of adaptivity.

2.2 Related Art for Vector Network Analyzers

A laboratory measurement of a linear system's transfer function $H(j\omega)$\, say a filter characteristic or an amplifier pass band characteristic, may be accomplished with a tool variously called a network analyzer,[26] vector voltmeter, and vector network analyzer (VNA). Before this invention, the VNA was limited in practical use to being a single piece of test equipment.

\ Note, for simplicity in this application, the function $H(j\omega)$ is not indexed by user, by inbound or outbound directions, or by the time variable, "t", although it is likely to be a function of all three when applied to a propagation link.

Pahlavan and Levesque[27] reported on using a conventional VNA for measuring the multipath delay spread characteristic in an indoor wireless environment. In their description, a conventional VNA was attached to the transmitter and receiver via long cables (tens of meters), and the VNA sweep probe was converted to a radio frequency signal and radiated into the indoor environment while the receiver's signal was brought back to the output port of the VNA after downconversion. The cited authors were then able to compute multipath characteristics in an indoor environment by appropriate signal processing of the measured H(jω) produced by their VNA.

Note that the use of a hardware connection to a single centralized device is out of the question over an active wireless link, but may be suitable for modeling and statistics gathering in a controlled indoor environment.

Getting around the problem of using cables to connect to a conventional VNA is not easy, but has been done before. In a paper by Baum[28] a channel modeling experiment was described in which two rubidium frequency standards were used, one at each end of a wireless link in the San Francisco Bay area. They were able to find phase shift versus frequency for this link, thanks to the stability of the rubidium standards.

In another study done in 2000 at Virginia Tech by Hao Xu[29] a conventional VNA connected by cables to the input and output of the link was suggested for doing short-range line-of-sight measurements of a 38 GHz wireless link multipath channel. In the same report, Xu goes on to describe a technique called a sliding correlation system (SCS) which he recommends for long distance propagation paths. As with the Baum experiment, Xu also uses rubidium frequency standards at each end of his SCS link. Briefly, his idea is to let the sliding correlator find correlation peaks due to multipath. In turn, the multipath peaks lead to a characterization, if desired, of amplitude versus frequency and phase shift versus frequency.

Using these two papers as a baseline, the inventors also searched U.S. patents which mention the words network analyzer[30]. It appears to us that that use of rubidium standards is the best and only prior art technique for realizing a distributed VNA. However, what is needed to achieve commercial viability and scaling to networks with thousands of users is a way to accomplish the equivalent measurement using inexpensive crystal oscillators, as well as a way to use the VNA concurrently with communications.

The inventors would now like to make clear their reasons for emphasizing the centrality of the transfer function H(jω) in wireless communications by citing some references and known facts.

The literature abundantly shows that optimal receiver processing for any communications link, not just fading links, depends on accurate knowledge of the channel transfer function[31]. For example, code word Euclidean distances[32] with forward error correction (FEC) codes determine the ultimate bit-error-rate performance. In turn, the code's distance properties can be calculated once H(jω) is known. The amplitude part of H(jω) is particularly important in establishing a link budget and maximum possible bits per second, the phase shift part of H(jω) is particularly important for equalization and the successful use of coded phase modulation[33]

H(jω) exists as a physical reality and can be measured. The previously cited references by Pahlavan, Levesque, Baum, and Xu confirm the fact that H(jω) is central to understanding the ability of a wireless link to carry communications.

Considering the difficulty evident in the literature in going from a single piece of test equipment in a laboratory to a distributed measurement of a propagation channel, it is worthwhile to examine carefully what makes these situations so profoundly different. The list which follows takes a step-by-step approach to demonstrating the artifacts which are introduced when it becomes necessary to have two widely separated end points, plus the use of inexpensive crystal oscillators at those end points. These are the difficulties the inventors had to overcome:

Separate local oscillator sources at transmit and receive ends will always inject some unknown phase noise process, referred to in this Application by $\phi(t)$, which directly cause errors in the phase angle part of the H(jω) measurement. In a single piece of test equipment one has the luxury of using the same oscillator at both ends of the device, so this problem doesn't exist. Note, that $\phi(t)$ is the end-to-end phase noise taking into account up-conversion and down-conversion to the frequency band being used.

Separate transmit and receive systems always have some initial uncertainty regarding the local oscillator long term stability settings, characterized as $\Delta f/f$ which can throw off measurement of phase. Once again, the laboratory network analyzer using a single frequency source does not have this problem. The Baum and Xu experiments compensated for non-zero $\Delta f/f$ by using rubidium frequency standards, carefully aligning the equipment to effectively yield $\Delta f/f \approx 0$ before and during each test.

Separate transmit and receive systems always have some initial uncertainty in synchronization. This Application refers to sync error as $\tau_\epsilon$. The conventional VNA's probe signal in contrast to this invention is always in sync between input and output of the device under test.

Separate transmit and receive systems always have some initial uncertainty in the local oscillator up-conversion and down-conversion frequencies which causes an initial uncertainty in the received signal's center frequency, referred to here by $f_\epsilon$.

All of these errors cause time-varying rotations in the received in-phase and quadrature components' complex number representation, masking the correct phase of H(jω) by large amounts in some cases, unless corrective action is taken. In this Application, the unwanted rotations are called artifacts, removal of which is described in DETAILED DESCRIPTION section 3.

The received measurement probe signal in a wireless transmission channel will be noisy, and may need to be filtered or processed before it can be useful.

Slow, stepped-frequency signals used in network analyzers are totally inappropriate for transmission over a communications network with thousands of subscribers, since this signal will interfere with data communications packets.

Subscriber equipment must be inexpensive, so the equipment-related errors described above, namely $\phi(t)$, $\tau_\epsilon$, $\Delta f/f$, and $f_\epsilon$, may be very significant especially soon after the subscriber first turns on the receiver. The challenge faced by the inventors was how eliminate these imperfections.

3. Objects and Advantages of this Invention

It was clear to the inventors that repetitive concurrent readings of the amplitude versus frequency and phase shift versus frequency of a fading channel are required if truly optimum communications are to be achieved over wireless channels operating in non-line-of-sight conditions. Furthermore, such measurements have to be made quickly and accurately, up to distances of several tens of kilometers, with plenty of time left over on the channel for data, otherwise the object of the invention would be defeated. The invention described here accomplishes these objects in a novel way by overcoming the problems alluded to above.

First, test signals are used that are interlaced with and separated from data communications leaving most of the time and frequency on the channel available for data.

Second, since the end points in the scenario setting for this invention could be many kilometers apart, a totally new method was invented to insure that the observed amplitude and phase shift versus frequency was due only to the propagation channel, and not artifacts.

Third, the invention insures that propagation measurement is fast, accurate, and easy to broadcast back to the transmitter so that results are useful right away.

Fourth, the invention permits cutting down on unneeded overhead that would ordinarily be used up by prior art devices in the form of handshake signals, preambles, among others. Hence the recommended appliqué form of this invention is an especially useful and synergistic combination of desirable outcomes, none of which are possible in prior art systems.

Since none of the prior and related art squarely address the unique set of challenging problems facing broadband wireless in non-line-of-sight mode of operation under 5 GHz, specific remedies are needed. Table 1 summarizes remedies as they will be addressed in this Application.

TABLE 1

Comparison of Conventional Approaches and Remedies Made by This Invention

| Prior and Related Art | Why Prior Art Adaptivity and Channel Estimation Techniques Are Not Adequate | Suggested Remedies Incorporated in This Invention |
| --- | --- | --- |
| Handshake Signals | Very inefficient for point-to-multipoint. Overloads signaling channel. Not scalable. | Use a single exchange, not repetitive handshake. One injected signal suffices for all users. Make it easy to convey measurements back to transmit end. |
| Modulation Fallback | Not scalable Overloads signaling channels. Pre-selection of modulation sets may be wrong. May be unstable if channel changes too fast. | Use an approach that is independent of modulation. Measure channel before selection of modulation, not after. |
| Embedded Tones | After-the-fact of selecting modulation, not before. No guarantee that packet will be received correctly, may have to repeat packets. Takes away needed space data in the packet. Phase coherence is lost from one end of band to the other. May be unstable. | Use a measurement signal outside the communication packet. Transmit power of the measurement signal will be chosen independent of the transmit power of the communications. |
| Preambles | After-the-fact of selecting modulation, not before. Large overhead on data. | Eliminate need for preambles Use propagation measurement to set equalizer directly. Transmit power of test signal will be chosen independent of communications. |
| Conventional Vector Network Analyzer | Two ends of test must be close together. Always need cables, OK only for modeling and scientific studies. | Make endpoints independent. |
| Vector Network Analyzer over Long | Two ends of test must use very accurate atomic frequency standard which is often reset and compared. | Use crystal oscillators at the end points. Remove artifacts caused by frequency errors. |
| Range Fading Link | OK as model builder for simulations and for long-term analyses. Cannot be used concurrent with communications in low-cost network. | Restrict measurement to only bands of interest. |

SUMMARY OF THE INVENTION

1. Overview

The invention is pictured in FIG. 1. It is an appliqué-combination of a novel vector network analyzer and an adaptive wireless communication link. The vector network analyzer realized in this invention provides crucial enabling information for adaptivity functions at both ends of a link, raising the over-all efficiency, equilibrium and quality of service in the network in which it used.

A test signal generator 1 interlaces test signals with communications signals from a data modulator 4 in a burst-mode operation by means of a time-multiplexing device 15. At point 15, the power levels are set independently. A facsimile test signal generator at the receiver 2 is adjusted through the intervention of a logical processor 3 which could be a personal computer or could be a task-specific processor. A downconverter 6 uses the facsimile test signal to heterodyne the received test signal. In turn, this downconverted signal is filtered in 7, A/D converted in 8, and sent to the logical processor.

The logical processor works in either one of two modes, an acquisition mode or a tracking mode. As a rule, acquisition mode occurs right after a cold start of the receiver. Tracking mode on the other hand occurs after acquisition was successful and enables the receiver to follow changes in the channel. If the signal is lost for any reason, the receiver will go back to acquisition mode.

Finally a measurements conveyance part distributes the propagation measurements to adaptivity functions at both ends. Measurement conveyance begins at the logical processor where the results of the measurement 33 are transferred to an adaptivity function 9 in the form of a numerical file. The adaptivity function, like the logical processor, may be realized in task-specific hardware or could, for example be part of a personal computer.

Conveyance continues by means of a data source 18 queuing the numerical file along with possible end-user data coming from a network interface 25. The ultimate destination of the numerical file with the channel measurement is the adaptivity function 34 at the transmit end. After 18, conveyance continues with data encoding 19, data modulation 32, up-conversion 14, and time multiplexing over the radio frequency channel by 17 for transmission 35 over the same band of frequencies used by the test signal. After reception by 26, the encoded channel measurement is down converted in 29, filtered in 30, A/D converted in 31, demodulated in 21 and routed by a demultiplex device 27 to the adaptivity function 34.

Channel measurements, having reached the adaptivity functions 9 and 34, are then interpreted in 9 and in 34 for discretionary use in modifying control parameters in the data demodulator 10, the data encoder 19, the data modulator 32, all at the receive end of the link, and in the data encoder 20, the data modulator 4, and the data demodulator 21, at the transmit end of the link. The ability to modify certain control parameters of modulators and demodulators in the course of communications is well known in the art. What is remarkable about this invention is the speed with which the channel information is made available, the clarity and accuracy possible using the test signals described here, and the subsequent efficiency gains in trading off communications air time with measurement air time.

The wireless radio link represented by antennas 26 and 35, use a portion of an allocated band of frequencies for communication in both directions, the toggle switches 16 and 17 working in synchronism to enable the frequency band to be used in both directions. Local oscillator components 93, 87, and 86 bring the radio frequency signal to or from an intermediate frequency signal. The process of up-conversion and down-conversion in 28, 29, 88, 13, and 14, along with power amplification in 93 and 90, low noise amplification in 89 and 92, are all conventional, and well known techniques used by radio frequency designers of data communication front-ends, going by the name, time-division-duplex (TDD). What is new and significant from an economy point of view in a large network, is that the test signal is needed in only one direction. The invention purposely takes advantage not only of duality in the external physical properties of wireless propagation links, but also in duality and stability of the internal circuitry. In particular the fact that the propagation is being measured between two points internal to the invention circuitry, point 96 and point 95, and not between two external points, is critical to the operation of the invention.

The description given above for conveyance of a numerical file from the logical processor to a distant station can be considered a normal piggy-back function of a wireless communications link. What is new about this conveyance is first, that the numerical file with channel information is being conveyed before the channel fading has had a chance to change, and second, the numerical information is available and used to update settings in the communications portions of the wireless link at both ends of the link in an expeditious fashion.

Hence, it will be understood that the operation of the VNA function does not depend on drawing a distinction between communication coming from the end-user's network interfaces 22, 23, 24, and 25, and communications internally generated by the measurements and conveyance functions, once the measurements are piggy-backed. When communications is coming from or to a network interface 22, 23, 24, 25, it will be referred to here for clarity as end-user data, while if the communications is internally generated to convey information about the channel and subsequent adjustments to be made in the data encoders, the data modulators and the data demodulators, as noted above, then it will be referred to as internal control information.

The preferred embodiment for the test signal is a composite of segments of linear FM sweeps, one of which is shown in FIG. 2. The in-phase and quadrature functions of a linear FM sweep 37 are obtained from equation (1) in DETAILED DESCRIPTION, section 2. An FM sweep signal has a start time 38 and a stop time 39 and a slope 40 whose units are Hz per second, and a power level. FIG. 3 shows settable parameters assumed for the generators at both ends: frequency band of interest 43, time duration of a specific sweep 47, rate of injection 41 and 42, and the slope 46 of either an upsweep or downsweep or both. Note, that some of these settable parameters are interdependent: slope depends on frequency span of interest 43 and duration 47 of sweep. The facsimile generator has three additional adjustable control parameters shown in FIG. 4, frequency offset 48 from nominal, time offset 49 from nominal, and time base 50. Note, that these additional three parameters are all with respect to the settable parameters so an actual realization of a facsimile test signal may look very different from that shown in FIG. 4. FIG. 5 shows two examples of preferred embodiment variations in the way test signals are interlaced with communications.

The band of interest 51 or 59 in FIG. 5 is purposely left in generic form in the description because the invention can be used in a variety of situations where the band of interest changes. MMDS allocations in the United States come in quanta of 6 MHz. WCS bands are 5 MHz. Test signals 52 are shown in a specific realization as combinations of two upsweeps 53 and 55 with downsweep 54. As a matter of design discretion, this test signal could just as well have been two downsweeps and one upsweep. An interlaced set of test signals is also shown at 58 as a repetition of 52. The fact that 52 contains three segments is related to the solution of the equations for artifact removal. Acceptable variations to the preferred embodiment can be four sweep segments per interlace, five sweep segments per interlace, etc. There is no prescribed number that must occur per interlace.

Example 2 of FIG. 5 shows a variation in how test signals can get interlaced with communications: instead of just forward-direction communication, forward communications 62 is here time multiplexed with a reversed direction communication burst 63, occupying the same frequency bands. This radio frequency multiplexing operation is carried out by synchronized toggle switches 16 and 17. Note that for illustration purposes, 62 and 63 are shown striated into 12 frequency channels each, 64 and 65. The number of channels shown, 12, in 64 and 65 is purely for example purposes and does not represent a restriction on how the invention is used. The point being made here is that the sweep bandwidth and the communications bandwidth of an individual end-user, do not have to be the same. The decision on channelization, length of burst, use of reverse channel communication, are all situation-dependent.

It is now useful to point out, after seeing FIGS. 3, and 5, that there is an interplay of design choices possible between the settable parameters of the test signal and the use of interlaced communications. It should be clear to someone familiar with designing the air interface for a communication network that proper use of the settability of the test signal permits efficient interlacing, efficient in this case meaning using up very little of the actual air time, leaving most of the air time available for communications. The inventors discovered that the time segments devoted to test signal, 51, 58, 60, and 66, for example, can be made just a few percent of the available air time without sacrifice of accuracy of measurement.

Figure 4:
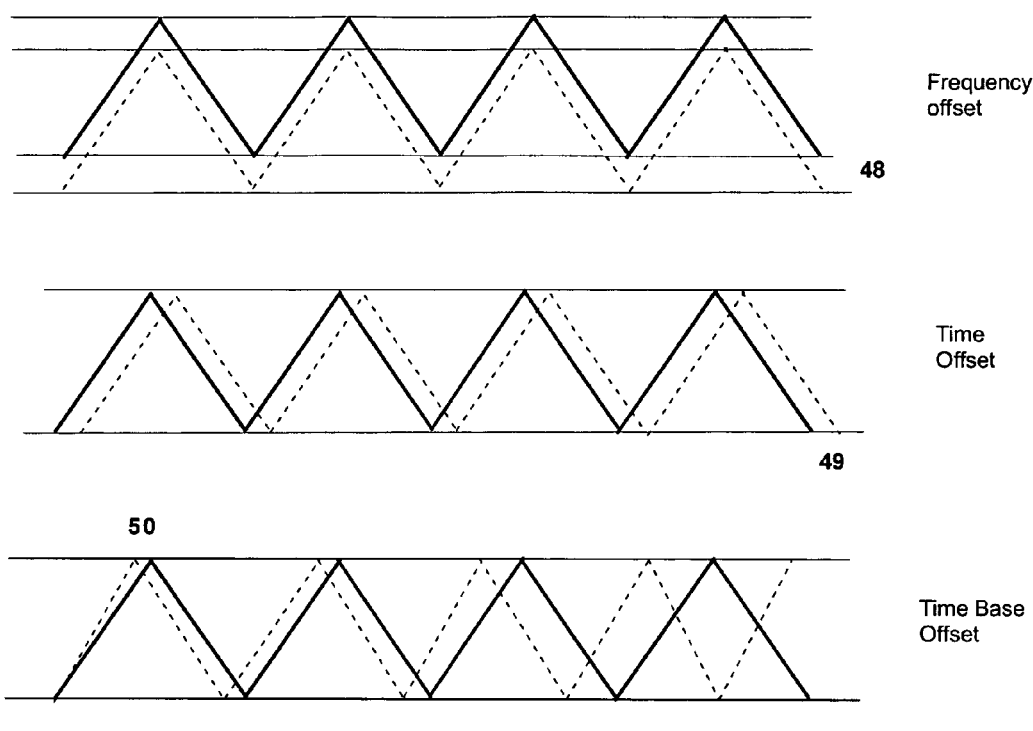

As just noted, settability is used as a mechanism to flexibly interlace test signals and communications. Once settability parameters are chosen, they may stay fixed for long periods, say during a particular communications transaction, and in fact may never change at all in a mature design. On the other hand, the adjustable control parameters on the facsimile signal shown in FIG. 4 are used in a feedback control loop created in the logical processor 3 controlling the facsimile generator 2 which performs the heterodyne operation 6, so tend to get used on a quasi-continuous basis during normal operation.

Notable in this invention is the presence of the third control parameter 50, time base. The inventors realized that one of several artifacts introduced into the vector analyzer measurement came about due to frequency instability of the crystal oscillators. This artifact, due to the relative error $\Delta f/f$ in oscillators, is a phase versus frequency additive component that varies parabolically in time, as shown in DETAILED DESCRIPTION, section 3. The ability to vary the time base 50 of the receiver facsimile signal permits finding and eliminating this artifact.

2. Concept of Operation

The inventors envision that this VNA appliqué will be part of an open standard interoperable with current and evolving air interface standards for broadband wireless systems. We believe that it is essential to broadband wireless evolution and wish to influence standards-setting bodies to eventually adopt one or more of the many possible preferred embodiment variations, as part of emerging Physical Layer (PHY) specifications. For this reason, modulation, forward error correction coding, etc., of the communications has been purposely left generic in this invention description.

Legacy PHY portions of modems are nearly 100% reusable when channel state information is gathered using the invention described here. A link which has been measured by using the vector network analyzer appliqué can be made to behave less like a fading channel and is more stable and reliable. Newer radios, as yet undeveloped, can be designed to more fully take advantage of the inundation of knowledge about channel states that will be possible with the vector network analyzer appliqué. For example, turbo coding[34] performance is very sensitive to channel state knowledge. The invention therefore makes turbo coding more reliable and easier to build.

Figure 6:
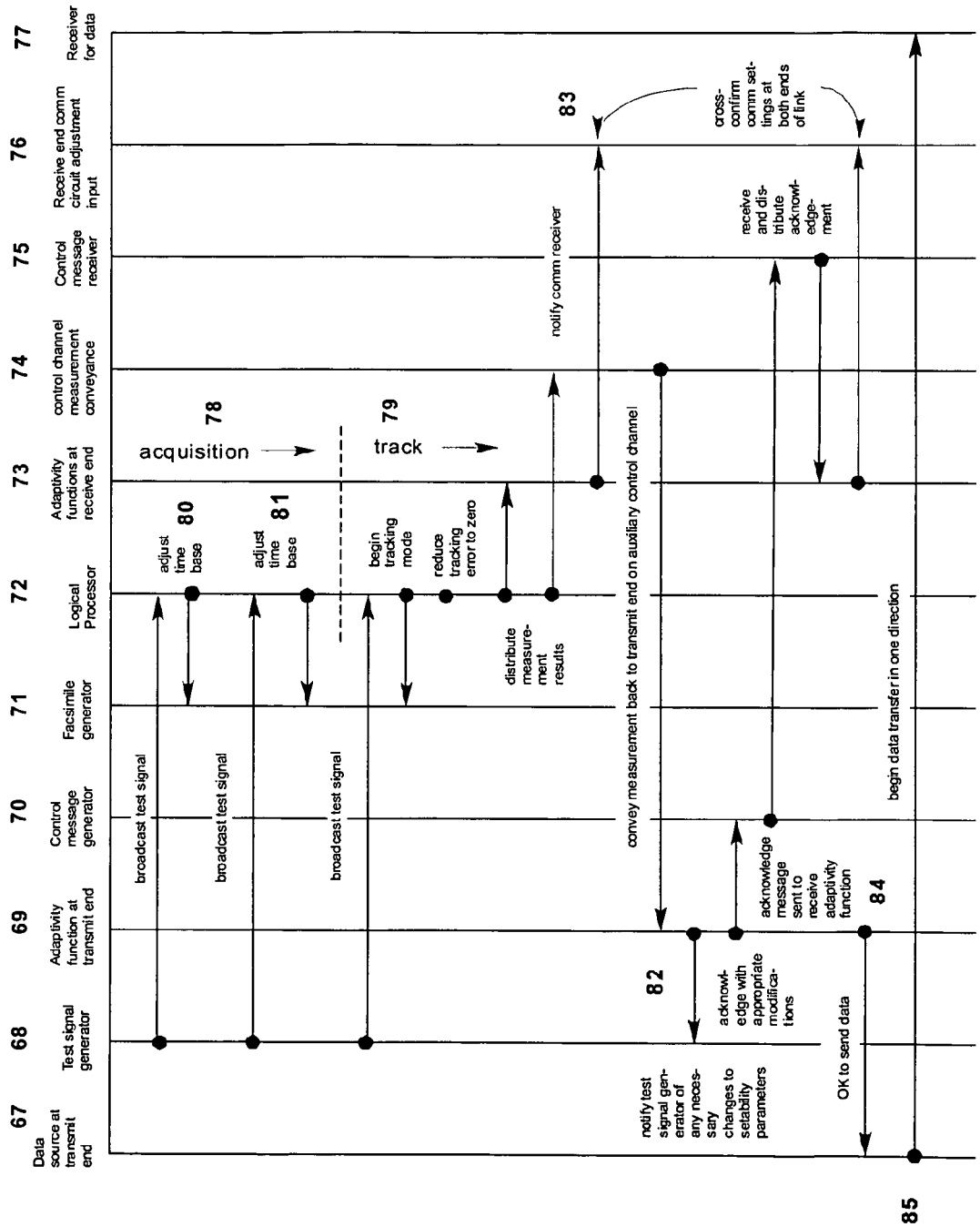

Based on this discussion, the inventors stress that there is a clean dividing line between the invention itself and the way the it eventually gets used. FIG. 6 illustrates the context-sensitivity of the invention operations. This figure is called a ladder diagram, and is commonly used in describing air interface processes in wireless systems. It shows in time sequence running from top to bottom of the figure, what typical operations come first, second, and so on, and some of the typical branching steps that are possible, depending on channel conditions and measurement outcomes. FIG. 6 is by no means an exhaustive listing of the possible operations of the invention.

The way the vector network analyzer appliqué would work in practice is that at the start of a communication session, which could be an Internet TCP/IP exchange, the test signal generator node 68 in FIG. 6, referring back to 1 in FIG. 1 would begin broadcasting test signals to all listeners who would in one possible realization be connected to the transmit end in a hub-spoke configuration, in another possible realization might be just a single transmit-receive pair. The following table relates FIG. 6 action nodes along the top of the figure to components shown in FIG. 1.

TABLE 2

Relating Nodes in Ladder Diagram to Invention Components Shown in FIG. 1

| Action node in FIG. 6 | Reference number used in FIG. 6 | Composite reference used in FIG. 1 |
|---|---|---|
| Data source at transmit end | 67 | 22 |
| Test signal generator | 68 | 1 |
| Adaptivity function at transmit end | 69 | 34 |
| Control message generator | 70 | 34 & 5 |
| Facsimile generator | 71 | 2 |
| Logical processor | 72 | 3 |
| Adaptivity functions at receive end | 73 | 9 |
| Control channel measurement conveyance | 74 | 33 & 9 & 18 |
| Control message receiver | 75 | 10 & 36 & 9 |
| Receive end comm adjustment input | 76 | arrow leading into 10 coming from 9 |
| Receiver for data | 77 | 24 |

These test signals would initially be interlaced with broadcast control signals only, indicating to the receiver that the transmit end was ready to carry on a conversation. The listener's initial responsibility would be to acquire the test signal 78, transfer from acquisition mode to track mode 79, then go into a communications mode 85 as well as a concurrent measurements conveyance mode 82. A quasi-steady-state condition of the transmitter and receiver would be reached when both ends were continuously communicating with each other 85 while carrying out 79, 82, 83, and 84 in a concurrent mode.

DRAWINGS

FIG. 1

A block diagram of the VNA appliqué invention.

FIG. 2

2(*a*) is a plot of the linear FM sweep signal's in-phase and quadrature components. In the preferred embodiment, the test signal is made up of segments of linear FM sweeps.

2(*b*) is a plot of the frequency versus time in an upward-going linear FM sweep.

FIG. 3

3(*a*) is a sketch showing two settability characteristics of the test signal: variation in frequency range and variation of repetition rate.

3(*b*) shows three additional settability parameters: time spacing between successive up and down sweeps, slope in Hz per second of the linear FM sweep, and time spacing between successive down and up sweeps.

FIG. 4

Three control parameters of the facsimile signal: frequency offset, time offset, and time base.

FIG. 5

5(*a*) is an alternative embodiment showing three discrete and time-separated measurement sweeps interlaced with forward-direction communications.

5(*b*) is an alternative embodiment with both forward-direction and reverse-direction communication interlaced with measurement test signals. A possible communications option, that of channelization is illustrated in this figure.

FIG. 6

A ladder diagram illustrates one possible context of the invention's use, showing that it is closely integrated with start-up and continuing operation of a communications session on a wireless network's air interface.

FIG. 7

Illustrates gross misalignment of the test signal and facsimile after a cold start.

FIG. 8

A sketch of the condition just after acquisition is complete, where the difference frequency between the transmitted and facsimile signal lies within the filter 7 bandwidth, see also FIG. 1.

FIG. 9

A block diagram of the heterodyne operation at the receiver between the received signal and the facsimile signal, when there is misalignment of the test signal and facsimile signal soon after cold start. This condition exists for a short period of time before the acquisition process begins.

FIG. 10

10(a) shows crossovers between the test signal and the facsimile signal in free-running condition soon after cold start.

10(b) shows the occurrence of a coincidence, defined as a slowed-down version of a crossover that occurs when the facsimile signal time base is speeded up. Note, slowing down the time base would also produce a similar coincidence.

FIG. 11

A block diagram of the heterodyne operation at the receiver when the logical processor is in tracking mode, showing the occurrence of signal rotations proportional to frequency difference between the test signal and the facsimile signal during an upsweep segment or during a downsweep segment.

FIG. 12

Shows how the slope of the linear FM sweep signal increases for positive values of Δf/f due to a combination of two effects: shorter time interval for a sweep segment, and overshoot in maximum frequency deviation of the linear FM sweep.

FIG. 13

Used in Table 6 to show the introduction of artifacts due to small errors in time offset, frequency offset, and oscillator offset. Artifact removal is based on taking sums, differences, and second differences of the frequency separations measured by the logical processor. FIG. 13(a) shows the effect of an oscillator offset error. FIG. 13(b) shows the effect of combining the oscillator offset error with a time sync error. FIG. 13(c) shows the effect of combining the oscillator offset error with the time sync error and with a frequency conversion error.

FIG. 14

Acceptable alternative embodiments of the test signal which can be made mathematically equivalent to the triangular sawtooth FM sweep signal of FIG. 13. Variations sketched in this figure permit room for interlacing of communications without changing the fundamental artifact-removal feature of this invention.

FIG. 15

Prototype vector network analyzer built and tested in 2001. The next five figures show plots of numerical files contained in the logical processor at various stages of acquisition and track. In the prototype, the logical processor was a PC.

FIG. 16

Appearance of the coincidence signal in the prototype caused by speeded up facsimile signal heterodyning a received signal during acquisition mode.

FIG. 17

Figure 16:
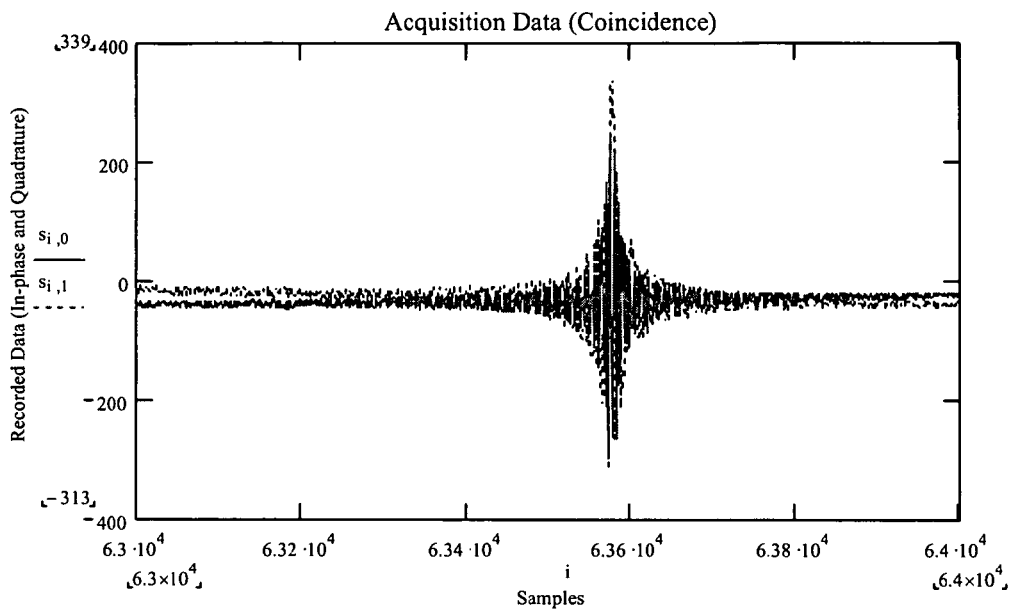

Same as FIG. 16 with expanded time base. Shows in-phase and quadrature signals during a coincidence as seen in the logical processor.

FIG. 18

Signal seen by logical processor in tracking mode during a single downsweep of the linear FM signal. Artifact due to Δf/f is still present, resulting in a parabolic phase versus time which is visible in this figure.

FIG. 19

After removal of the parabolic phase versus time artifact and setting frequency offset to zero, the logical processor outputs this signal combination, which has both an in-phase and quadrature signal component, as a time analog of H(jω) over the sweep bandwidth which in the case of the prototype constructed in 2001, is approximately 6 MHz.

FIG. 20

Figure 19:
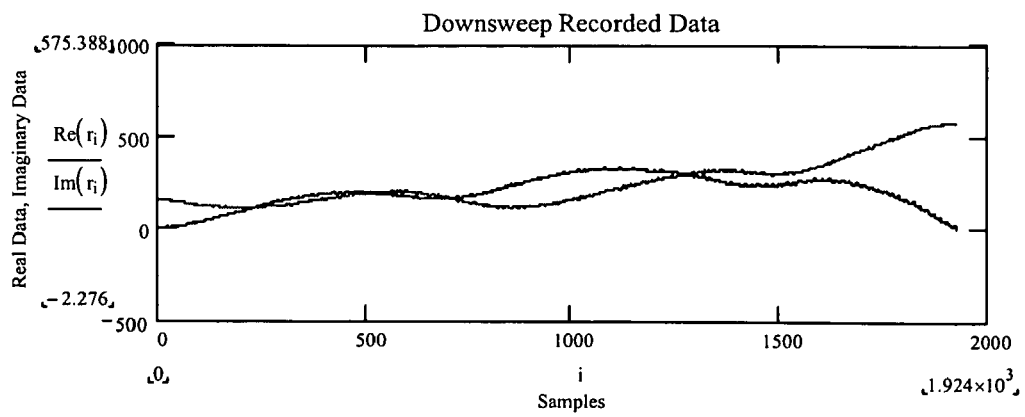

Same numerical file as in FIG. 19 but plotted with in-phase on x-axis against quadrature on y-axis, to create a polar plot of H(jω).

FIG. 21

Example of an alternative embodiment with CDMA instead of linear FM sweep test signals.

FIG. 22

Controllable parameters on an alternative embodiment CDMA facsimile signal are, time offset, frequency offset, and time base offset.

FIG. 23

Alternative embodiment of the vector network analyzer as a pure measurement system instead of a communications appliqué system. This Figure repeats the numbering system used in FIG. 1 and eliminates certain end-user interfaces which are no longer needed.

DETAILED DESCRIPTION

1. Preferred Embodiment

In this description, the preferred embodiment uses test signals that are segments of linear FM sweep signals. Many combinations of such signals are possible. The nature and benefits of the invention are not dependent on the precise format and placement of linear FM sweep signals, so there may be many variations in how the sweep signals are interlaced with communications. Additional embodiments such as the use of CDMA test signals are also possible and will be described in section 5.

The underlying purpose and benefit of the invention is its ability to compute, distribute and make use of, a frequency transfer function for each individual link in a wireless network subject to fading channel conditions.

At the start of the procedure envisioned for any typical use of the invention, there is a two-step process called acquisition and tracking which is independently performed in each receiver while a transmitting station broadcasts test signals interlaced with communication.

Acquisition

Figure 7:
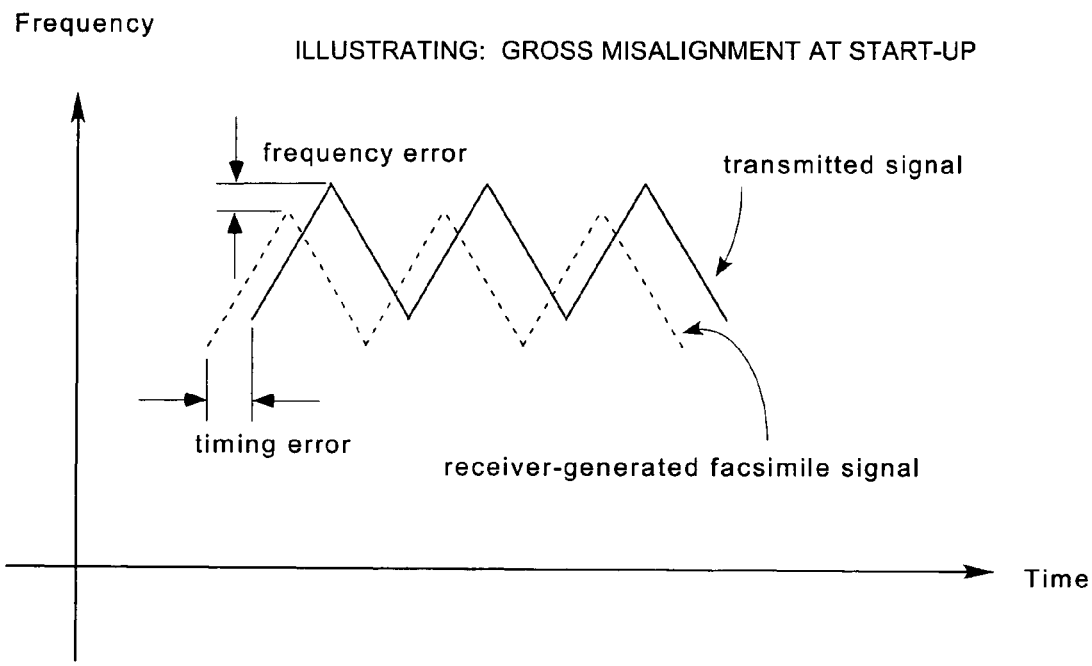

A transmitted test signal is sent out by one station and received independently by a number of receiving stations. Since the receiving stations begin operation from a cold start, their knowledge of the transmit signal's timing is nil to begin with, so a boot-up type of operation is needed whereby each receiver sequentially discovers various facts about the transmitted signal that allows it to reduce the misalignment. The presence of gross misalignment at start-up is illustrated in the sketch in FIG. 7.

Completion of the acquisition step, however close it may be, is still not perfect alignment. The next mode, tracking, is meant to reduce any remaining misalignment errors to zero.

Tracking

As just noted, the tracking stage commences when acquisition has reduced misalignment errors to a sufficiently small condition. Conditions during tracking are illustrated in the sketch in FIG. 8, and can be characterized as the maintenance of a small difference frequency, small enough to keep the downconverted signal within a relatively narrow bandwidth of the filter preceding the A/D converter in FIG. 1, filter 7. Tracking is a continuous process that exists as long as the received signal strength is sufficient. If the signal is lost, acquisition may again be necessary. In the preferred embodiment, adjustments are made during tracking mode by the logical processor, abruptly in the form of a correction which eliminates all the artifacts at once. The logical processor then has available the desired channel estimate in numerical form. A prototype version discussed in section 4 performed the artifact removal as a continuous feedback operation for reasons which are given in that section. Continuous feedback takes longer than the preferred embodiment.

In summary, the new VNA works in a two-step process, acquisition and tracking, during which equipment imperfections such as timing error, frequency offset error, among others, are progressively reduced and eliminated. The logical steps used in this invention are listed in Table 3.

Steps 2, 3, and 4 in Table 3 will now be described in somewhat more detail. Since the free-running probe generator in the receiver may be relatively far off in timing and in frequency offset, the incoming signal and the locally generated signal will repeatedly cross, producing short periodic pulses into the baseband filter, as shown in the sketch in FIGS. 9 and 10(*a*). These pulses will not be sufficient to produce a clear determination of the timing and frequency offsets. The concept adapted by this invention to facilitate acquisition is to make the locally generated signal artificially fast or artificially slow so that a relatively long, higher powered, coincidence pulse occurs when the two signals overlap, as sketched in FIG. 10(*b*).

It should be clear that it does not matter whether the signal runs fast or slow: it is always going to be easier to detect the artificial coincidence than to detect periodic crossovers.

Having measured the coincidence on (in this case) the downsweep, the locally generated signal can be adjusted so that a coincidence next occurs on the upsweep. With two such measurements, the timing and frequency offset error can be

TABLE 3

Logical Steps During Acquisition and Tracking Modes

Figure 9:
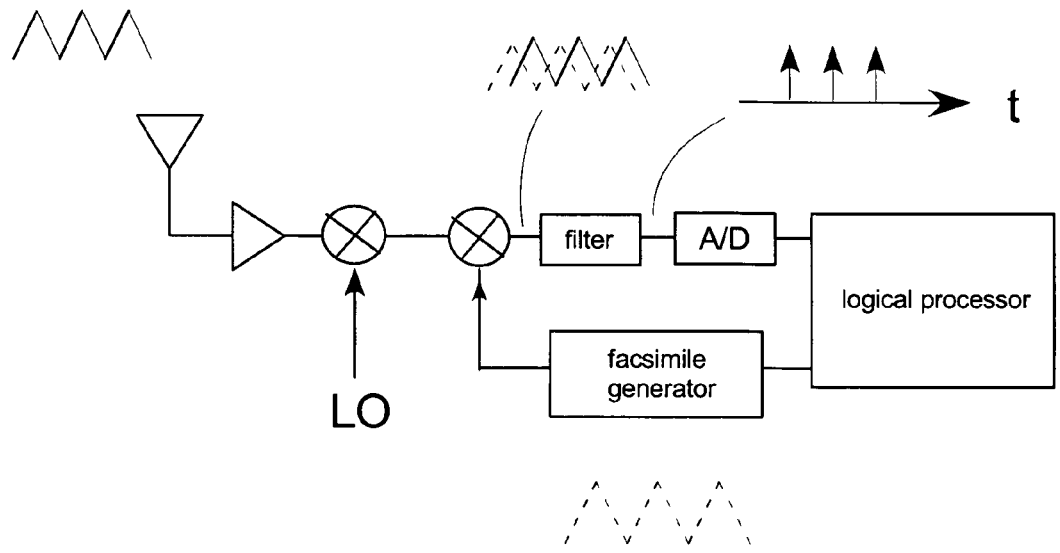
Figure 10:
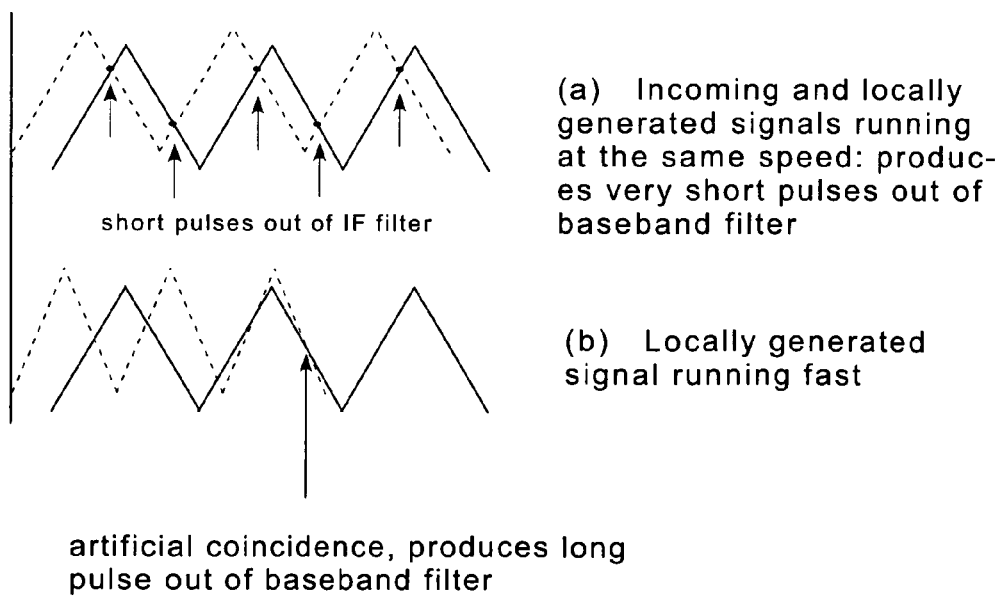
Figure 11:
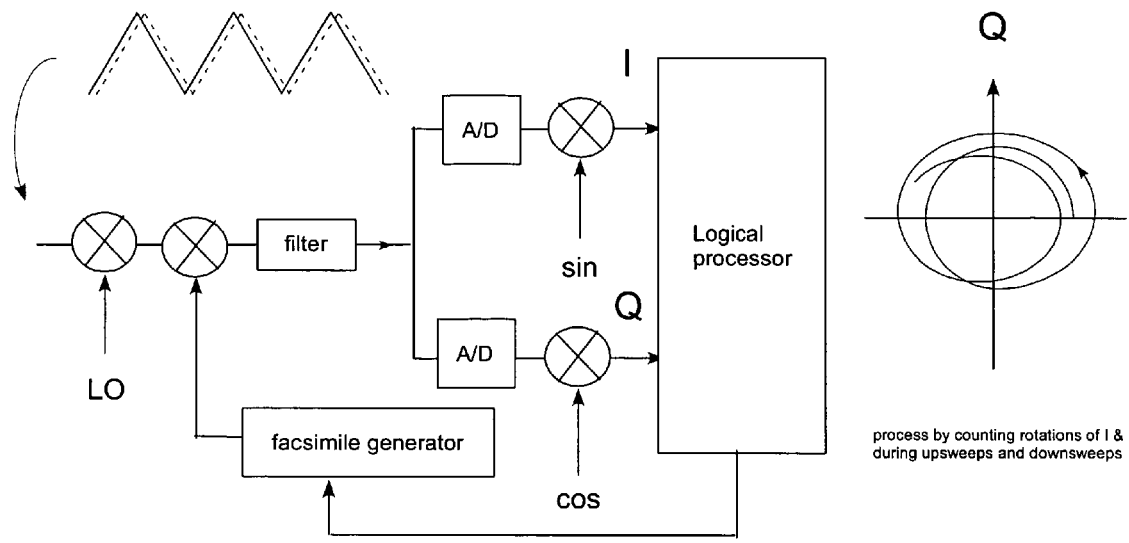

| Stage of Operation | step # | Receiver Processing | Notes and Explanation |
|---|---|---|---|
| Cold Start | 1 | Turn on receiver. Begin free-running generation of facsimile signal. | It may be necessary to return to this step in the event the signal is lost, or at the start of a new communications transaction. |
| Acquisition | 2 | A/D convert filtered baseband signal obtained by heterodyning received signal with locally generated replica. | FIG. 9 illustrates the heterodyne operation with free running facsimile. Crossover points create short pulses which are not easily detectable. |
|  | 3 | Switch time base of facsimile to FAST or to SLOW. Logical processor searches for coincidence. Logical processor commands facsimile to alter start time and time base. Search for second coincidence. | Uses technique shown in FIG. 10(b). Logical processor controls time base to create two coincidences. Location of coincidences determines removal of gross misalignment errors. |
|  | 4 | Correct timing and frequency offset in locally generated replica of transmit signal. This is an abrupt correction that should bring the downconverted signal within the baseband filter. Facsimile time base reverts to nominal. | When this step is successful, the acquisition mode is over and heterodyned signal is confined to the bandwidth of the filter 7 preceding the A/D converter 8 of FIG. 1, as sketched in FIG. 8. |
| Tracking | 5 | Examine output of baseband filter. Was acquisition successful? NO: go back to step #3. YES: continue with step #6. | Frequency difference between the received and locally generated signal now totally within filter 7 bandwidth. |
|  | 6 | Count rotations on successive upsweeps and downsweeps. | Counting rotations is the preferred embodiment: rotation counting is a specific realization of a frequency estimate. FIG. 11 sketches heterodyne operation and rotation counting tracking. |
|  | 7 | Use counts to correct artifacts. Alternative embodiment of this step is to use feedback control loop to gradually eliminate artifacts. | Intermediate stage in tracking. Preferred embodiment goes directly to step #8. |
|  | 8 | Force timing error to zero. Force frequency offset error to zero. Force oscillator instability to zero. | Explanation is given in section 3 for artifact removal. Uses sum and differences of rotation counts to solve for and to remove artifacts, Table 6. |
|  | 9 | Calculate $H(j\omega)$. | This function, which is the desired output of the new VNA, is contained in a file in the logical processor after artifact removal, as shown in equation (19). | computed and the locally generated signal can be adjusted again so that the difference frequency lies entirely within the filter 7 bandwidth. Then step #6 in Table 3, the tracking stage of the measurement, begins.

2. Calculation of H(jω)—Ideal Case No Artifacts

Probe signal building blocks used in the preferred embodiment are made up of what is variously called a chirp signal, a frequency sweep signal, or linear FM signal, see FIG. 2. The complex (bandpass equivalent) of a chirp signal or linear frequency modulated signal is[35][36][37]:

$$s(t) = e^{j2\pi \frac{1}{2}mt^2} \text{ for } 0 \le t \le T_{FM} \tag{1}$$

Note, that when the phase angle of the complex signal is differentiated, one gets the instantaneous angular frequency as a function of time:

$$\dot{\theta} = \frac{d}{dt}\left(2\pi \frac{1}{2}mt^2\right) = 2\pi mt \text{ rads per sec} \tag{2}$$

This function is a frequency ramp with slope m Hz per second.

$$f(t) = \frac{\dot{\theta}}{2\pi} = mt \text{ Hz } 0 \le t \le T_{FM} \tag{3}$$

The maximum frequency at the end of the ramp is therefore $mT_{FM}$. FIG. 2 (a) shows a time plot of the real and imaginary part of equation (1) which become the in-phase and quadrature components of the real signal, along with a plot of the instantaneous frequency, shown in 2 (b).

The equivalent impulse response channel from tower to receiver is generally represented as a complex bandpass impulse response, h(t) which lasts from t=0 to some initially unknown t=$T_{max}$, called the delay spread of the channel. A line of sight (LOS) link ideally has no dispersion.

$$h(t)=\delta(t) \text{ in LOS: a unit impulse, delay spread is zero.} \tag{4}$$

The response of the channel to the chirp signal is, by convolution, $$r(t) = \int_{-\infty}^{+\infty} s(\tau)h(t-\tau)d\tau \tag{5}$$

Substituting (1) into (5), and considering the output of the channel only inside the chirp interval $T_{max} \le t \le T_{FM}$, $$r(t) = \int_0^{T_{FM}} e^{j2\pi \frac{1}{2}m\tau^2} h(t-\tau)d\tau \text{ for } T_{max} \le t \le T_{FM} \tag{6}$$

With a change of variables this integral becomes, letting χ=τ−t, (7)

$$r(t) = \int_{-t}^{T_{FM}-t} e^{j2\pi \frac{1}{2}m(x+t)^2} h(-x)dx = e^{j2\pi \frac{1}{2}mt^2} \int_{-t}^{T_{FM}-t} e^{j2\pi \frac{1}{2}mx^2} e^{j2\pi mxt} h(-x)dx$$

Now recognize that the upper limit can be replaced by zero. Rearranging terms, $$r(t)e^{-j2\pi m \frac{1}{2}t^2} = \int_{-t}^{0} e^{j2\pi m \frac{1}{2}x^2} e^{j2\pi mxt} h(-x)dx \tag{8}$$

Letting ω' ≜ 2πmt, $$r(t)e^{-j2\pi m \frac{1}{2}t^2} =$$

$$\int_{-t}^{0} h'(-x)e^{j\omega' x}dx = \int_{0}^{t} h'(x)e^{-j\omega' x}dx \text{ where } h'(x) \triangleq e^{j2\pi m \frac{1}{2}x^2} h(x)$$

Replace the upper limit by ∞ since t is always greater than the delay spread, $$r(t)e^{-j2\pi m \frac{1}{2}t^2} = \int_{0}^{\infty} h'(x)e^{-j\omega' x}dx \triangleq H'(j\omega').$$

The left hand side of equation (8) is a processed (deswept) version of the received signal. The right hand side of equation (8) is a time-analog of a close approximation to H(jω) as demonstrated next.

The delay spread, $T_{max}$, is expected to range from nanoseconds for LOS to 10's of microseconds for NLOS users 20 to 40 kilometers away from the tower. Duration of the sweep should therefore be made much longer than the expected size of the delay spread. Note from (8) that as m gets smaller, the approximation for H(jω) gets better, as would be expected. Nevertheless, in this application, we do not have the luxury of letting m→0, so additional signal processing may be needed. Table 3 shows how the impulse response becomes distorted for non-zero slope.

If the sweep bandwidth is large enough to resolve individual reflection coefficients in the impulse response, then correcting this error is relatively straightforward since the correction can be done independently at each coefficient. Table 4 indicates that for sweeps on the order of a tenth of a second and bandwidths of 2 MHz, this error is not significant at all, so will be neglected in what follows.

TABLE 4

Distortion Due to Non-Zero Slope (Fast Sweep) In Channel Probe

| delay | DEGREES ERROR IN IMPULSE RESPONSE AT THE DELAY SPREAD TIME sweep duration | | | | | | | | |
|---|---|---|---|---|---|---|---|---|---|
| spread | 20,000 | 30,000 | 40,000 | 50,000 | 60,000 | 70,000 | 80,000 | 90,000 | 100,000 μ-sec |
| sweep 2 MHz | | | | | | | | | |
| 5 | 0.5 | 0.3 | 0.2 | 0.2 | 0.2 | 0.1 | 0.1 | 0.1 | 0.1 |
| 10 | 1.8 | 1.2 | 0.9 | 0.7 | 0.6 | 0.5 | 0.5 | 0.4 | 0.4 |
| 15 | 4.1 | 2.7 | 2.0 | 1.6 | 1.4 | 1.2 | 1.0 | 0.9 | 0.8 |
| 20 | 7.2 | 4.8 | 3.6 | 2.9 | 2.4 | 2.1 | 1.8 | 1.6 | 1.4 |
| 25 | 11.3 | 7.5 | 5.6 | 4.5 | 3.8 | 3.2 | 2.8 | 2.5 | 2.3 |
| μ-sec | | | | | | | | | |
| sweep 6 MHz | | | | | | | | | |
| 5 | 1.4 | 0.9 | 0.7 | 0.5 | 0.5 | 0.4 | 0.3 | 0.3 | 0.3 |
| 10 | 5.4 | 3.6 | 2.7 | 2.2 | 1.8 | 1.5 | 1.4 | 1.2 | 1.1 |
| 15 | 12.2 | 8.1 | 6.1 | 4.9 | 4.1 | 3.5 | 3.0 | 2.7 | 2.4 |
| 20 | 21.6 | 14.4 | 10.8 | 8.6 | 7.2 | 6.2 | 5.4 | 4.8 | 4.3 |
| 25 | 33.8 | 22.5 | 16.9 | 13.5 | 11.3 | 9.6 | 8.4 | 7.5 | 6.8 |
| μ-sec | | | | | | | | | |

Therefore, the deswept signal is in fact a replica of the channel transfer function:

$$\text{deswept signal} = r(t)e^{-j2\pi m \frac{1}{2}t^2} = H(j\omega') \quad (9)$$

where $\omega' = 2\pi mt$ and $T_{max} \leq t \leq Y_{FM}$

Equation (9) is the preferred embodiment logical processor computation in the ideal case where there are no artifacts.

3. Non-Ideal Case Removal of Artifacts

A closer look will show how initial misalignment due to equipment and measurement uncertainties adds signal processing burden to the task over-and-above equation (9). The derivation leading to equation (9) assumed the end-state (step 9 of Table 3) of acquisition and tracking, namely a perfectly in-sync receiver with perfect frequency translation and perfect oscillator match at transmit and receive stations, and no phase noise. Therefore let's back up from this condition by introducing the errors that must be discovered and removed during the tracking phase. Introducing misalignment error terms into a modified version of equation (8) shows what happens to the measurement while tracking steps are in operation as given in Table 3, steps 6, 7, and 8.

Let $\phi(t)$ be the phase noise in the receiver referenced to the transmitter, from end-to-end.

Let $\Delta f/f$ be the oscillator long-term instability at the receiver relative to the transmitter.

Let $f_\epsilon$ be the initial up- down- conversion offset error.

Let $\tau_\epsilon$ be the initial time sync error.

The probe signal is still the same, see equation (1), but the desweeping signal is modified by these errors.

$$\text{desweep signal} = e^{-j2\pi \frac{1}{2}(m+\Delta m)(t-\tau_\epsilon)^2 + j2\pi f_\epsilon(t-\tau_\epsilon) + j\phi(t)} \quad (10)$$

Slope error $\Delta m$ is caused by the relative long-term frequency uncertainty of the receiver oscillator relative to the transmitter oscillator, $\Delta f/f$. Say $\Delta f$ is positive. This not only speeds up the sweep, it causes the maximum sweep frequency to overshoot. These two effects multiply to give, $$\frac{m+\Delta m}{m} = \left(1 + \frac{\Delta f}{f}\right)^2 \cong 1 + 2\frac{\Delta f}{f} \quad (11)$$

Figure 12:
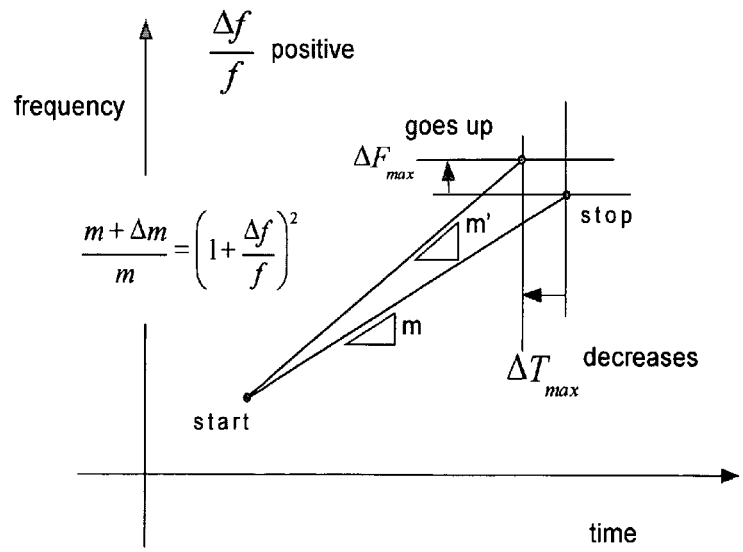

FIG. 12 is a sketch explaining equation (11). Therefore, the non-ideal desweep signal in terms of initially unknown equipment uncertainties becomes, $$\text{desweep} = e^{-j2\pi \frac{1}{2}(m+2\frac{\Delta f}{f}m)(t-\tau_\epsilon)^2 + j2\pi f_\epsilon(t-\tau_\epsilon) + j\phi(t)} \quad (12)$$

Expand the square term:

$$(t-\tau_\epsilon)^2 = t^2 - 2t\tau_\epsilon + \tau_\epsilon^2 \quad (13)$$

Now collect terms and ignore second-order errors:

$$\text{desweep} = e^{-j2\pi \frac{1}{2}mt^2 - j2\pi \frac{\Delta f}{f}mt^2 + j2\pi m\tau_\epsilon t + j2\pi f_\epsilon t + j2\pi f_\epsilon \tau_\epsilon + j\phi(t) - j2\pi \frac{1}{2}m\tau_\epsilon^2} \quad (14)$$

Combining all of the error terms, the processed time function at the receiver, instead of being the wanted analog of the channel transfer function becomes:

$$\text{deswept } r(t) = H(\omega')e^{-j2\pi \frac{\Delta f}{f}mt^2 + j2\pi f_\epsilon t + j2\pi \tau_\epsilon mt + j\phi(t) + j\cdot\text{constant phase term}} \quad (15)$$

where $H(\omega')$ was previously defined in equation (8). Collecting terms inside the exponent:

$$\text{deswept } r(t) = H(\omega')e^{-j2\pi \frac{\Delta f}{f}mt^2 + j2\pi(f_\epsilon + \tau_\epsilon m)t + j\phi(t) + j\cdot\text{constant phase term}} \quad (16)$$

Thus, $f_\epsilon + \tau_\epsilon m$ is a combined frequency-time error noticeable as a rapid spin in deswept r(t), rapid compared to the other effects inside the exponent. A rough estimate of the number of cycles of spin during a sweep time $T_{FM}$ of the received signal is, $$\text{cycles of spin in deswept } r(t) \approx (f_\epsilon + \tau_\epsilon m)T_{FM} \quad (17)$$

Meanwhile, the parabolic term $$-j2\pi \frac{\Delta f}{f} m t^2$$

is adding a phase error which increases slowly at first, then more rapidly as the sweep ends. The spreadsheet in Table 5 gives some idea of the accumulated phase error due just to the parabolic term when the oscillator instability is comparable to commercial grade crystal oscillators. The numbers in the spreadsheet, divided by 360, give the additional number of rotations caused by the parabolic term in (16). Order-of-magnitude, the parabolic term is not significant to the spin term but could be very significant compared to the phase noise and to the actual phase of $H(j\omega)$. Now note from Table 4, that the parabolic term just by itself would mask the true angle versus frequency characteristics of $H(j\omega)$.

The number of cycles of spin on the first down-sweep is, similarly $(f_\epsilon - \tau_{\epsilon-down-1} m) T_{FM}$.

When $\Delta f/f$ is not zero, the sawtooth FM signal walks with respect to the incoming received signal as shown in FIG. 13(a), in such a way that time sync keeps slipping by an amount $(\Delta f/f) T_{FM}$ every $T_{FM}$ seconds. Thus, since the original time error is designated $\tau_{\epsilon-up-1}$ on the first up-sweep, during the first down-sweep, sync error will have an added amount, $$\tau_{\epsilon-down-1} = \tau_{\epsilon-up-1} + (\Delta f/f) T_{FM}. \quad (18)$$

This term keeps accumulating as shown in FIGS. 13(b) and 13(c). Table 6 shows what would be recorded if one measured the successive differences in cycle spins, from all sources, neglecting the small number of spins contributed by the parabolic term and $H(j\omega)$ itself. It shows that the second differences in number of up-and down-spins is proportional to $\Delta f/f$ and no longer contains the terms $f_\epsilon$ or $\tau_{\epsilon-up-1}$. This fact means that by adding a minimum of two more FM sweeps, one down

TABLE 5

Accumulated Parabolic Phase Error Due to $\Delta f/f$ of Commercial Grade Crystal Oscillators sweep 2 MHz DEGREES ERROR IN MEASURED TRANSFER FUNCTION AT END OF SWEEP
sweep duration

| delta f/f | 20000 | 30000 | 40000 | 50000 | 60000 | 70000 | 80000 | 90000 | 100000 μ-sec |
|---|---|---|---|---|---|---|---|---|---|
| 1.00E−07 | 1.4 | 2.2 | 2.9 | 3.6 | 4.3 | 5.0 | 5.8 | 6.5 | 7.2 |
| 5.00E−07 | 7.2 | 10.8 | 14.4 | 18.0 | 21.6 | 25.2 | 28.8 | 32.4 | 36.0 |
| 1.00E−06 | 14.4 | 21.6 | 28.8 | 36.0 | 43.2 | 50.4 | 57.6 | 64.8 | 72.0 |
| 5.00E−06 | 72.0 | 108.0 | 144.0 | 180.0 | 216.0 | 252.0 | 288.0 | 324.0 | 360.0 |
| 1.00E−05 | 144.0 | 216.0 | 288.0 | 360.0 | 432.0 | 504.0 | 576.0 | 648.0 | 720.0 |

A person familiar with OFDM modulation in general and coded phase modulation in particular, will realize that these errors are not acceptable and must be removed. Let us now consider the logical processor calculations to remove artifacts. Note, that the current assumption, for simplicity is that the test signal is a sawtooth waveform produced by repeating the upsweep and downsweep in a periodic fashion without any breaks in time. Without writing out all the terms, suffice it to say that the resulting sawtooth FM signal will have these characteristics:

The number of cycles of spin on the first up-sweep is approximately $(f_\epsilon + \tau_{\epsilon-up-1} m) T_{FM}$, where $\tau_{\epsilon-up-1}$ is the sync error on the first up-sweep.

and one up, the error $\Delta f/f$ can be separated out from the other two and can be computed. Once the spin components due to $\Delta f/f$ are removed (set $\Delta f/f$ equal to zero in Table 6), the alternating first differences all become proportional to the initial error $\tau_{\epsilon-up-1}$, so this error may also be computed. Finally, if instead of first differences, one recomputed first sums, that is 1+2, 2+3, 3+4, and so on with $\Delta f/f$ set to zero, these would all be proportional to $f_\epsilon$, so it could then be computed.

What this brief discussion has shown is that three sweeps are sufficient to compute and therefore abruptly remove, timing, frequency offset, and oscillator stability errors.

TABLE 6

First and Second Differences of Spin Counts Permit Removal of Artifacts

| | Which Sweep? | Cycle Spins During Sweep with Accumulating Delay Error | Alternating First Difference | | Second Difference |
|---|---|---|---|---|---|
| 1 | Up number 1 | $(f_\epsilon + \tau_{\epsilon-up-1} m) T_{FM}$ | | | |
| 2 | Down number 1 | $(f_\epsilon - (\tau_{\epsilon-up-1} + (\Delta f/f) T_{FM}) m) T_{FM}$ | 1 | 1-2 $(2\tau_{\epsilon-up-1} m + (\Delta f/f) T_{FM} m) T_{FM}$ | |
| 3 | Up number 2 | $(f_\epsilon + (\tau_{\epsilon-up-1} + 2(\Delta f/f) T_{FM}) m) T_{FM}$ | 2 | 3-2 $(2\tau_{\epsilon-up-1} m + 3(\Delta f/f) T_{FM} m) T_{FM}$ | 2-1 $2(\Delta f/f) T_{FM}^2 m$ |
| 4 | Down number 2 | $(f_\epsilon - (\tau_{\epsilon-up-1} + 3(\Delta f/f) T_{FM}) m) T_{FM}$ | 3 | 3-4 $(2\tau_{\epsilon-up-1} m + 5(\Delta f/f) T_{FM} m) T_{FM}$ | 3-2 $2(\Delta f/f) T_{FM}^2 m$ |
| 5 | Up number 3 | $(f_\epsilon + (\tau_{\epsilon-up-1} + 4(\Delta f/f) T_{FM}) m) T_{FM}$ | 4 | 5-4 $(2\tau_{\epsilon-up-1} m + 7(\Delta f/f) T_{FM} m) T_{FM}$ | 4-3 $2(\Delta f/f) T_{FM}^2 m$ |
| 6 | Down number 3 | $(f_\epsilon - (\tau_{\epsilon-up-1} + 5(\Delta f/f) T_{FM}) m) T_{FM}$ | 5 | 5-6 $(2\tau_{\epsilon-up-1} m + 9(\Delta f/f) T_{FM} m) T_{FM}$ | 5-4 $2(\Delta f/f) T_{FM}^2 m$ |
| | . . . and so on | | | | |

Going back to equation (16), and setting these errors to zero, the deswept signal can be written, $$\text{deswept } r(t) = H(\omega')e^{j\phi(t) + j \cdot \text{constant phase term}} \quad (19)$$

Therefore, the observed deswept signal (with other errors removed) now consists of the time analog of the transfer function $H(j\omega')$ at some unknown angle, (the constant phase term), along with a phase noise component $\phi(t)$.

Without loss of generality, the term $\phi(t)$ may be taken as the difference between the phase noise at the beginning of the sweep and the phase noise at some point in time t into the sweep since the constant phase term incorporates the starting phase. Then using conventional techniques[38][39], the sweep duration $T_{FM}$ can be chosen sufficiently small to make the accumulated phase noise as small as wanted. However, as Table 4 indicated, if the sweep is too short compared to the delay spread, another type of phase error is introduced, a phase twist in the computed impulse response according to equation (8). Hence there is a range over which $T_{FM}$ can be traded off to minimize both of these effects.

Finally, the remaining constant phase term in equation (19) is not important to the operation of this invention. Instead, it can be considered as a normally occurring phase error found in any coherent system of communication, that must be removed in some fashion, say by a phase locked loop.

Figure 14:
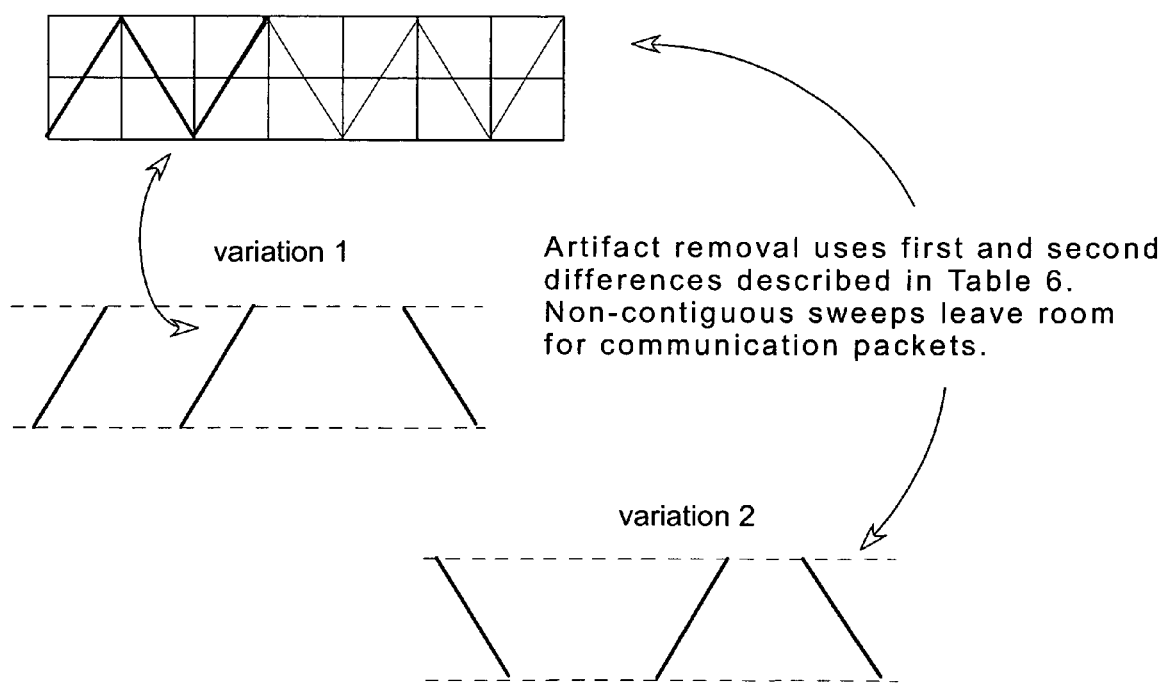

The analysis in this section showed that it is possible to remove misalignment errors that cause artifacts with a minimum of three sweeps, two up and one down (or two down and one up) during the tracking stage. The sweeps do not necessarily have to be contiguous but could occur in many different combinations, a few of which are shown in FIG. 14, as long as appropriate care is taken to account for the accumulation of timing errors between sweeps.

4. Description of a Prototype VNA

Figure 15:
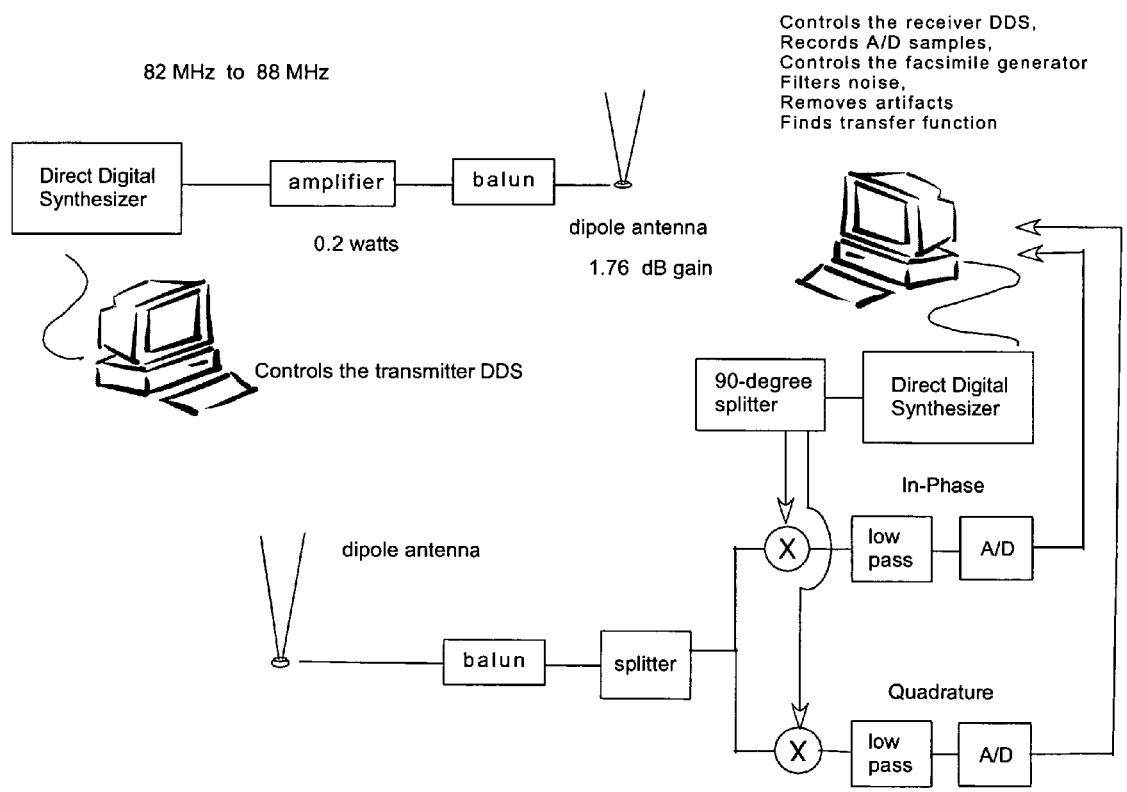

The inventors have developed a prototype working model of the VNA described in this Application and obtained permission in 2001, in the form of a Special Temporary Authority from the FCC, to test it outdoors. See FIG. 15. Note, FIG. 15 is not in the form of an appliqué to a communication system. Its purpose is to test algorithms for artifact removal.

The Direct Digital Synthesizer, FIG. 15, is made by Analog Devices, and is their Model Number AD9852/PCB. The 30 dB amplifier with 0.2 watts output is made by Q-Bit and is their model number QB-500-2 RF Amplifier 8718-11. The transmit antenna is a 300 ohm television rabbit ears. A balun is used to match the Q-Bit amplifier to the antenna. The same transmit unit was used to run all of the tests approved for 2001 operation by the FCC. Frequencies requested were 82 MHz to 88 MHz. The frequency sweep waveform is completely settable by the Analog Devices direct digital synthesizer.

Maximum effective radiated power (ERP) or equivalent isotropically radiated power (EIRP) from the television rabbit ears, which is the equivalent of a short dipole with maximum gain 1.77 dB[40], along with a radiated power of two tenths of a watt, results in an EIRP of −5.2 dBw or about 25 dBm. The FCC emission designator is for a repetitive FM energy dispersal function with linear frequency up-ramp and down-ramp having continuous phase at the transitions. According to paragraph 2.201 of 47 CFR Chapter 1 (10-1-99 Edition), this signal has emission designator F3N: F for frequency modulation, 3 for single channel containing analog information, and N for no information transmitted since no additional information is carried other than the sawtooth.

Examples of in-phase and quadrature waveforms recorded during a test with transmitter and receiver separated by 35 meters are shown next. Sampled output of the baseband filter during an acquisition coincidence depicted schematically in FIG. 10(b), is shown here in FIG. 16. Duration of the sweep is roughly one second long and represents a sweep covering 6 MHz. The prototype invention was first calibrated by measuring a known transfer function.

Figure 17:
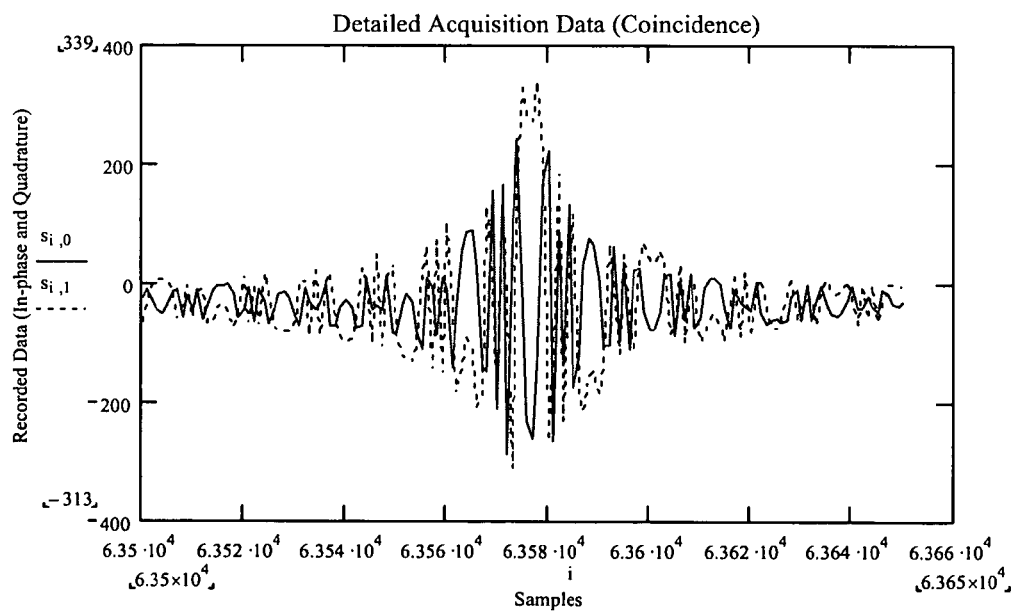
Figure 18:
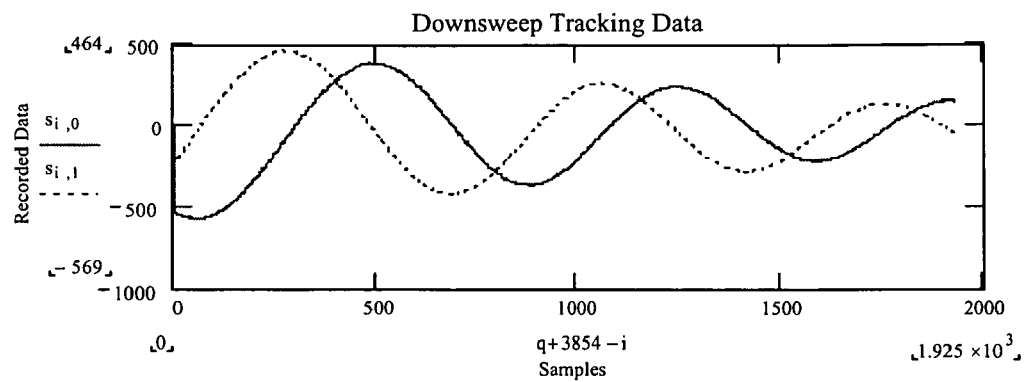

FIG. 17 shows the artificial coincidence in more detail, illustrating that the rotation direction changes at the precise time of the coincidence maximum. Sampled output of baseband filter during tracking (step 6 of Table 3) is shown in FIG. 18. The heterodyned signal's frequency is now totally within the baseband filter. See also FIGS. 8 and 11 for definition of the tracking condition. Also shown in FIG. 18 is visible parabolic phase versus time due to $\Delta f/f$. FIG. 19 shows the logical processor results after parabolic phase distortion due to $\Delta f/f$ has been removed, and all residual spin removed. FIG. 19 is the computed $H(j\omega)$ real part and imaginary part, corresponding to the in-phase and quadrature signal respectively.

Figure 20:
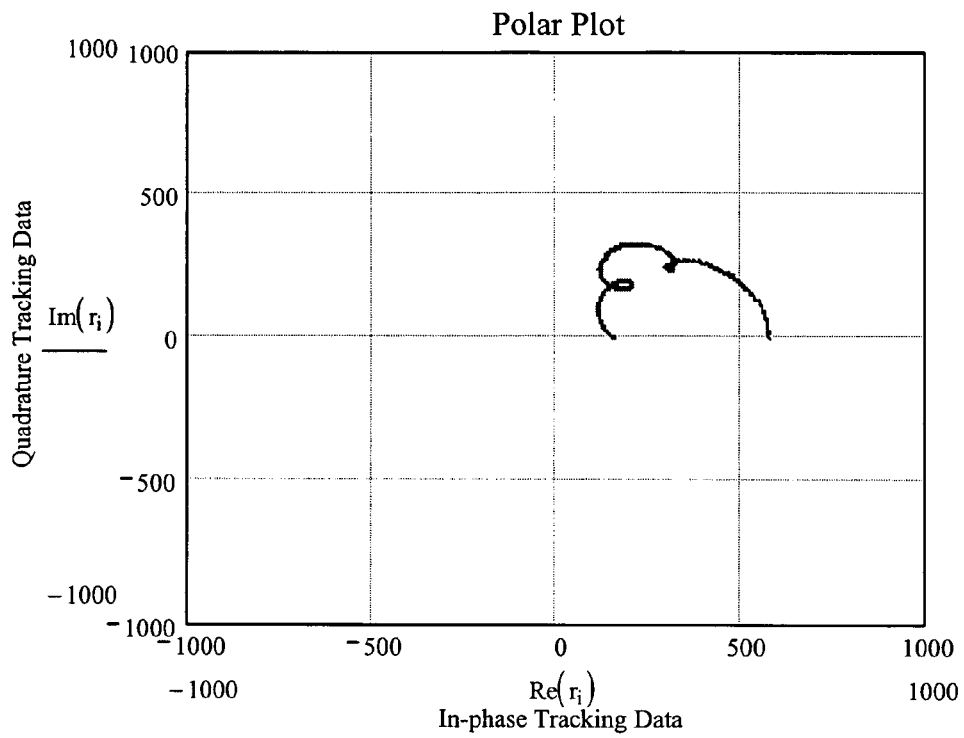

FIG. 20 shows the in-phase and quadrature signals plotted in polar coordinates. Note, significantly, changes in amplitude and phase over the band. Some multipath signal cancellation is evident in the link. At the RF frequency used in the prototype, phase noise is negligible.

5. Additional Embodiments

A person familiar with the design of signal processing electronics will see that there are many implementations possible to this invention. The implementation described in this Application is preferred by the authors in the prototype version they have built, where flexibility is necessary to allow hardware to be field-calibrated and software to be tested and debugged. However, as the authors point out, many variations of the underlying invention can be configured to meet different wireless system constraints and system needs.

5.1. Changes in the Format of the Test Signal

The inventors have already noted that settability parameters on the test signal and the facsimile signal produce a wide variety of additional embodiments that:

enable flexibility in the way signals get interlaced with communication, see FIG. 5(a), enable flexibility between start-up of communications and continuation of communications, enable flexibility to interlace signals with both forward-going and backward-going communications over the same frequency band as shown in FIG. 5(b).

Figure 21:
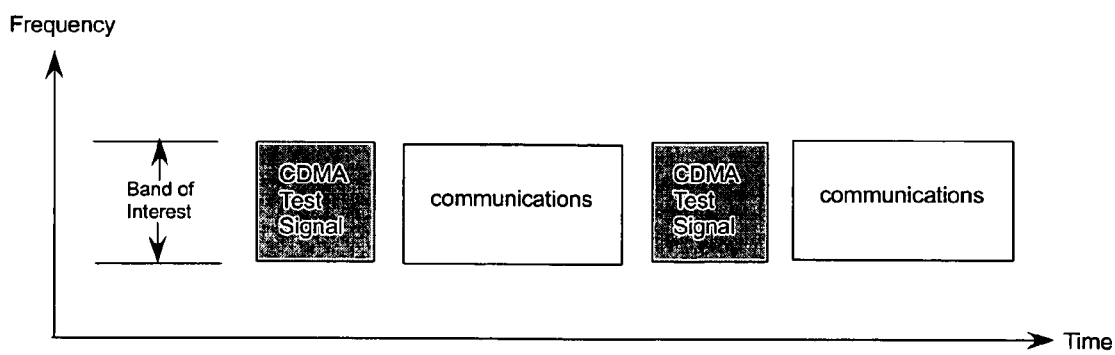
Figure 22:
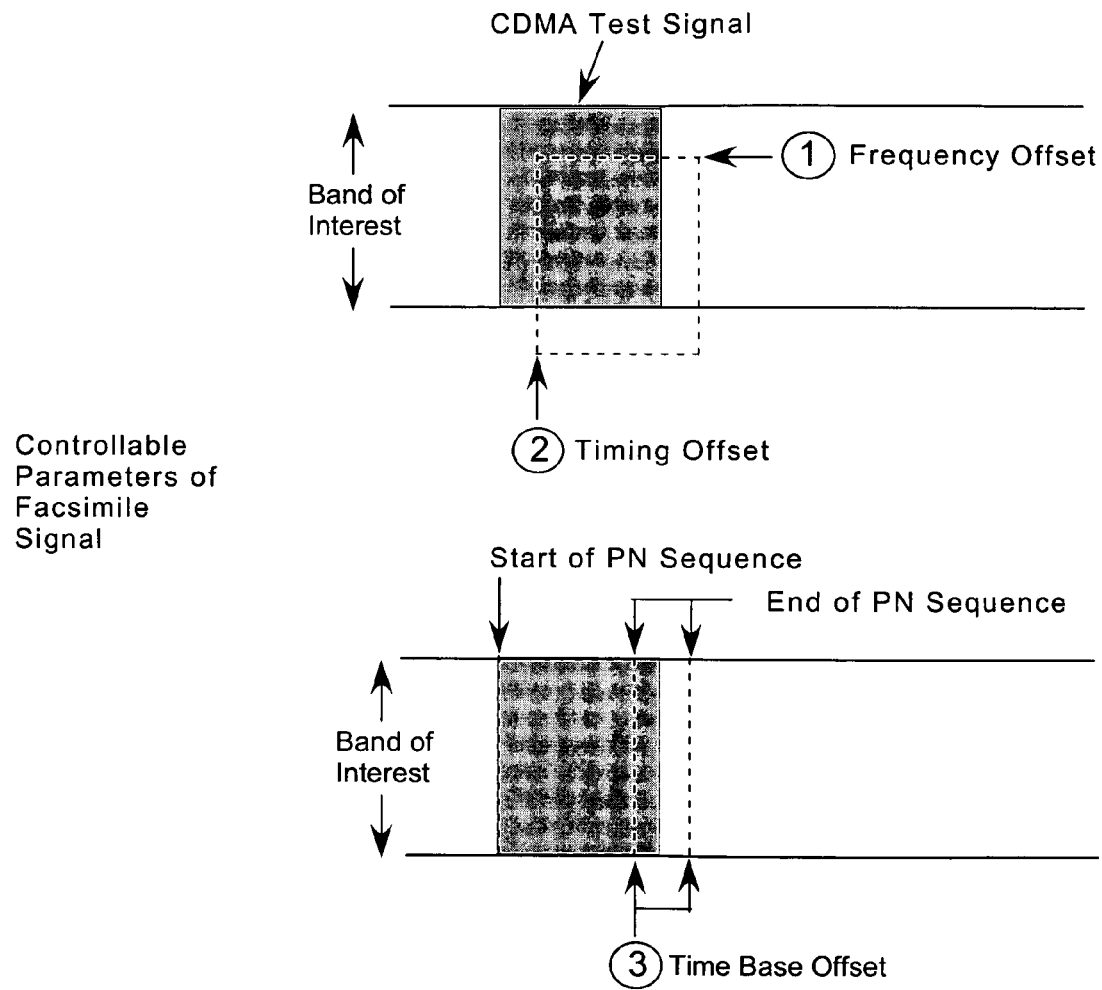

Also, the inventors pointed out that the use of linear FM sweeps shown in FIG. 2 and equation (1) were preferred embodiments but that there were many other suitable waveforms to use for the VNA probe signal. A simple example of an alternative embodiment is the use of CDMA[41] as the test signal. FIG. 21 shows a CDMA burst interlaced with communications. FIG. 22 shows the facsimile CDMA signal undergoing control variations of start time, frequency offset and time base.

With CDMA, there would also be an acquisition mode and a tracking mode operationally having the same function and purpose as our preferred embodiment. The reason someone would choose to implement the invention with CDMA instead of linear FM is that they may already have CDMA chip sets and software which can more easily be adapted to the logical processor control functions.

Figure 3A:
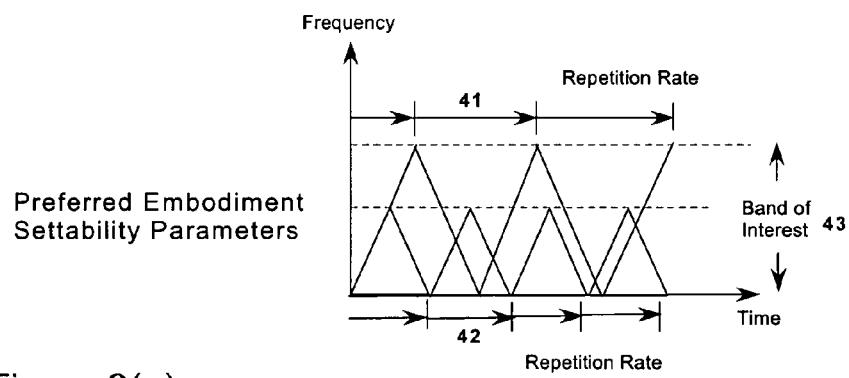
Figure 3B:
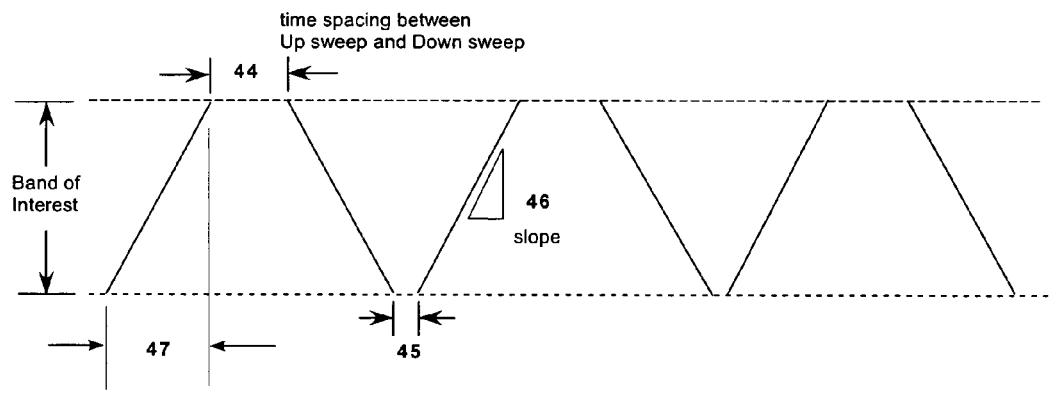

Other test signals and facsimile signals are possible, but all would have to have:

settability parameters similar to that shown in FIGS. 3(a) and 3(b), control parameters on the facsimile similar to that shown in FIG. 4, operation by means of embedding into an active communications channel, start-up functionality by means of acquisition and track modes in the logical processor, measurements collection and conveyance capability when tracking errors are driven close to zero, indicating removal of artifacts.

One final word about the logical processor's determination that artifact removal is complete. The way coherent digital communications receivers work, they normally have to acquire and track out residual errors in frequency, timing, and unknown phase. As equation (19) showed, a random constant phase is not considered the problem of the VNA but of the demodulator. Similarly, a small frequency offset or time offset can be left for the demodulator to find and remove. The job of the VNA in this invention is to find out how amplitude and phase shift vary across the band of the communications, so any small fixed frequency offset and time offset, which translate into a linear phase versus frequency term added to the underlying phase versus frequency caused by multipath, are immaterial to the final result. Note also, that time offset and frequency offset, even if they are large, do not affect the amplitude versus frequency of the measurement.

Stated in different terms, the answer produced by the VNA in this invention is not unique. While this fact may seem disconcerting at first, an experienced communications engineer familiar with the way modems work will understand that non-uniqueness is not a liability in the channel measurement as long as the modem sees a signal within its normal capture range. The inventors envision that the adaptivity function 9 in FIG. 1 in its control of the data modem 10, will perform frequency equalization using the H(jω) just measured, and will also correct time and frequency offsets that were estimated in the logical processor.

The statements above point out the synergism realized in the use of this invention. To take advantage of the adjustments in time and frequency offset that were measured in the logical processor as it removed artifacts, it is necessary to synchronize the communications start time and frequency with the measurement signal time and frequency. Hence the precise start of the communication 56 and 57, or 62 and 63 in FIG. 5, must be synchronized with the test signal's time and frequency. This is possible since the transmit end adaptivity function 34 controls parameters on the data encoder 20 and the data modulator 4 before the signals arrive at the interlacing function 15. A person familiar with the design of data modems, realizing that provision must be made for timing and frequency offset at the receive end, would therefore know how to use the logical processor's instructions 33 to the adaptivity function 9 to enhance the design of the data modem receiver 10 in the manner discussed above.

5.2. Alternate Embodiment: The New VNA as a Pure Channel Measurement Device

Figure 23:
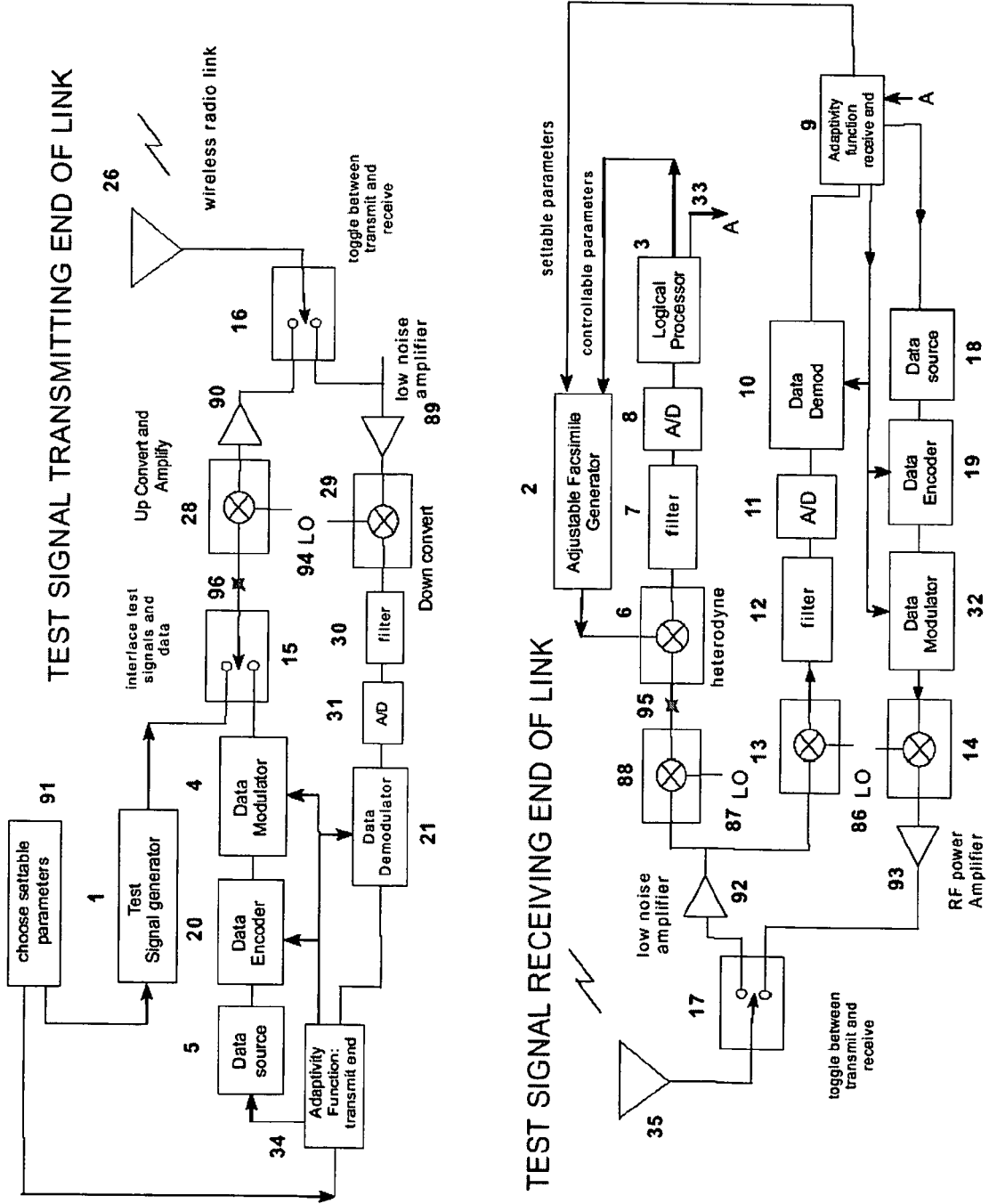

The inventors envision that there will be a need to run the new VNA design in a pure data-gathering mode. FIG. 23 shows an additional embodiment of the invention with end-user network connections removed and the associated data multiplexing toggle switches removed. Note, that communications components are here used entirely for internally generated control and measurements distribution. A storage device for the measurements is not shown in the figure. Once again, a critical element in the invention's usefulness is the fact that the propagation path is being measured between two internal points, 96 and 95 in FIG. 1 and also in FIG. 24. This fact should not lessen its usefulness as a pure propagation gathering instrument since every propagation measurement contains effects from the measurement gear itself, antennas, mixers, and so on.

5.3. Conclusion

The invention described here combines two functions, a new way to perform rapid and accurate vector network analysis at-a-distance along with communications. The combination provides a valuable way to combat problems found with fading multipath channels used in wireless systems under 5 GHz operating in non-line-of-sight mode having significant diffraction around buildings, trees and foliage which cause time-varying fading.

The invention can take the form of an appliqué or of a pure measurement. The invention can be used in fixed wireless as well as mobile wireless systems. Operationally, the invention is part of an air interface that could be selected from current and future standards for wireless systems.

SEQUENCE LISTING not applicable

REFERENCES CITED IN SPECIFICATION

[1] ITU Recommendation ITU-R P.526-6, Propagation by Diffraction (Question ITU-R 202/3), 1978 to 1999.

[2] ITU Recommendation ITU-R P.530-8, Propagation Data and Prediction Methods Required for the Design of Terrestrial Line-Of-Sight systems, (Question ITU-R 204/3), 1978 to 1999.

[3] Lee, W. C. Y., Mobile Communications Engineering Theory and Applications Second Edition, McGraw Hill Telecommunications, Chapter 4, section 4.2.

[4] Gibson, Jerry D., The Mobile Communications Handbook Second Edition, CRC Press, IEEE Press, Chapter 18, Rayleigh Fading Channels by Bernard Sklar, 1999.

[5] ITU Recommendation ITU-R P.526-6, Propagation by Diffraction (Question ITU-R 202/3), 1978 to 1999.

[6] Bertoni, Radio Propagation for Modern Wireless Systems, Prentice Hall PTR, Upper Saddle River, N.J., pp. 132-136.

[7] ITU Recommendation ITU-R P.530-8, Propagation Data and Prediction Methods Required for the Design of Terrestrial Line-Of-Sight systems, (Question ITU-R 204/3), 1978 to 1999.

[8] See Gibson, op cit., Chapter 33 by Levesque, A. H., and Pahlavan, K., Section 33.5, the Ricochet Network.

[9] ITU-T Recommendation V.34, Series V: Data Communication Over the Telephone Network, (02/98), section 10.1.2.4 Line Probing Signals, and 11.6 Rate Negotiation. See also CCITT V.32, CCITT V.22, CCITT V.21.

[10] U.S. Pat. No. 5,347,539, High Speed Two Wire Modem, Sridhar, M. R., Mukherjee, A., Moran, J. L., Sep. 13, 1994.

[11] GTE Lenkurt, Engineering Considerations for Microwave Communications Systems, 1972, GTE San Carlos Calif.

[12] Reudink, D. O., Properties of Mobile Radio Propagation Above 400 MHz, IEEE Transactions on Vehicular Technology, November 1974, appearing in Rappaport, T. S., Cellular Radio and Personal Communications, A Book of Selected Readings, IEEE 1995.

[13] IEEE Vehicular Technology Society Committee on Radio Propagation, Coverage Prediction for Mobile Radio systems Operating in the 800/900 MHz frequency Range, IEEE transactions on Vehicular Technology, Vol. 37, No. 1, February 1988, reprinted in Cellular Radio and Personal Communications A Book of Selected Readings, edited by Theodore S. Rappaport, IEEE Press, 1995.
[14] Greenstein, L. J., Michelson, D. G., and Erceg, V., Moment-Method Estimation of the Ricean K-Factor, IEEE Communications Letters, Vol. 3, No. 6, June 1999, p 175-176.
[15] Schwartz, M., Bennett, W. R., and Stein, S., Communications systems and Techniques, Mc-Graw Hill Book Company, Inter-University Electronics Series, 1966, Chapter 9, Fading Communications Media.
[16] Erceg, V., et al, Channel Models for Fixed Wireless Applications (final IEEE 802.16 TG3 ad hoc version), IEEE 802.16.3c-01/29r1, February 23, 2001, available on the web site of NIST, Boulder Colo.
[17] Weinstein, S. B., and Ebert, P. M., Data Transmission by Frequency-Division Multiplexing Using the Discrete Fourier Transform, IEEE Transactions on Communications Technology, Vol. Com-19, No. 5, October 1971.
[18] Van Nee, R., and Prasad, R., OFDM For Wireless Multimedia Communications, Artech House Publishers, Boston, 2000, section 5.2.1 Two-Dimensional Channel Estimators, and 5.2.3 Special Training Symbols.
[19] Yang, B., Letaif, K. B, Cheng, R. S. and Cao, Z., Timing Recovery for OFDM Transmission, IEEE Journal on selected Areas in communications, Vol. 18, No. 11, November 2000, pp. 2278-2291.
[20] Yeh, C-S, Lin, Y., Channel Estimation Using Pilot Tones in OFDM Systems, IEEE Transactions on Broadcasting, Vol. 45, No. 4, December 1999. pp. 400-409.
[21] Sklar, B., Rayleigh Fading Channels in Mobile Digital Communication Systems Part II: Mitigation, IEEE Communications Magazine, July 1997, page 107, The Viterbi Equalizer As Applied to GSM.
[22] Simon, M. K., Hinedi, S. M., Lindsey, W. C., Digital Communication Techniques Signal Design and Detection, Prentice Hall Engelwood Cliffs, N.J., 1995, section 9.4 Equalization Techniques.
[23] Proakis, J. G., Digital Communications Third Edition, McGraw-Hill Series in Electrical and Computer Engineering, 1995, Chapter 11, Adaptive Equalization.
[24] Sklar, op cit.
[25] See for example the IEEE 802.16 working group discussion on received signal strength indication (RSSI) as an adaptivity approach. The URL for this group is.
[26] Agilent Technologies (Formerly Hewlett Packard) 2001 Catalog, pages 266-302.
[27] Pahlavan and Levesque Wireless Communication Networks John Wiley and Sons 1995.
[28] Baum, Daniel S., et al, Measurement and Characterization of Broadband MIMO Fixed Wireless Channels at 2.5 GHz, Proceedings of ICPWC '2000, Hyderabad India, 2000.
[29] Xu, Hao, Terrestrial Radio Wave Propagation at millimeter-wave Frequencies, Department of Electrical Engineering and Computer Engineering, Virginia Tech ETD, http://scholar.lib.vt.edu/theses/available/etd-05042000-16180036/
[30] U.S. patents using the words network analyzer (sample) in Communications and radar patents:
(a) High-Speed Broadband Wireless Communication System Architecture, #6240274, Izadpanah.
(b) Swept-Step Radar System and Detection Method using the Same, #6225941, Gogineni.
(c) Practical Space Time Radio Method for CDMA Communication Capacity Enhancement, #6108565, Scherzer.
(d) Radio Environment Analysis Apparatus, #6084928, Kuwahara.
(e) Network Analyzer Measurement Method Using Adaptive Signal Processing, #6065137, Dunsmore.
[31] Proakis, J. G., Digital Communications Third Edition, McGraw-Hill Series in Electrical and Computer Engineering, 1995, page 586, Optimum receiver for an AWGN Channel with ISI.
[32] Viterbi, Andrew J., and Omura, Jim K., Principles of Digital Communication and Coding, McGraw Hill, N.Y., 1979, Section 4.4.
[33] Schlegel, Christian, Trellis Coding, IEEE Press, © 1997, IEEE, New York City.
[34] Ziemer, Rodger E., and Tranter, William H., Principles of Communications, Systems Modulation and Noise, John Wiley and Sons, © 2002, Section 10.3.12 page 558.
[35] Helstrom, C. W., Statistical Theory of Signal Detection, Pergamon Press, Oxford, 1968, page 357.
[36] Skolnik, Introduction to Radar Systems Second Edition, page 422, McGraw Hill, 1980.
[37] All signals described in this patent Application are shown in complex envelope bandpass equivalent notation. See for example, Oppenheim, A. V., and Schafer, R. W., Digital Signal Processing, Prentice-Hall, Engelwood Cliffs, N.J., 1975, page 363.
[38] Gardner, Floyd, Phaselock Techniques, Wiley-Interscience Publication, John Wiley and Sons, 1979, page 100, section Heading: Oscillator Phase Noise.
[39] Wolejsza, Chester A., Effects of Oscillator Phase Noise on PSK Demodulation, Comsat Technical Review Volume 6 Number 1, Spring 1976, page 107-125.
[40] Gagliardi, Robert M., Satellite Communications, Second Edition, Van Nostrand Reinhold, N.Y., © 1991, Table 3.1 Antenna Patterns.
[41] Sklar, Bernard, Digital Communications Fundamentals and Application, Second Edition, © 2001, Prentice Hall PTR, Upper Saddle River, N.J., Section 11.1.5. page 672.

The invention claimed is:

1. A system comprising:
a test signal injector which interlace test signals with communications signals, wherein one or more of the test signals is an FM sweep;
a transmitter which transmits said interlaced signals over wireless communications paths from a multiplicity of transmitting antennas;
receivers which receive said interlaced test signals by means of a multiplicity of antennas and determines measurements of amplitude versus frequency and phase shift versus frequency characteristics of the multiple propagation paths from each transmitting antenna to each receiving antenna; and
a signal processing circuit which use one or more of said measurements to correct for effects of the multiple propagation paths on the communications;
wherein test signal receivers comprise:
one or more signal generators producing facsimiles of the multiple transmitted test signals wherein said generators are adjustable and can have an initially unknown time offset from a transmitted test signal, an unknown frequency offset from a transmitted test signal, and an unknown time base of generation from a transmitted test signal;
a downconverter which uses facsimile signals to heterodyne said received test signals to obtain down-converted signals; and
a logical processor capable of analyzing said downconverted signals and providing control signals to said adjustable facsimile signal generators to remove the initially unknown time offset, the initially unknown frequency offset, and the initially unknown time base of generation between the transmitting antenna injected signal and the receiving antenna facsimile signal.

2. The system of claim 1 wherein each of the multiple test signal receivers comprise:
an adjustable signal generator which generates a facsimile of said injected test signal;
a downconverter which uses said facsimile signal to heterodyne said received test signals to obtain a down converted signal; and
a logical processor capable of analyzing said down converted signal and providing a control signal to said adjustable facsimile signal generator to adjust one or more parameters of said facsimile signal generator.

3. The system of claim 1, wherein the test signal injector is capable of setting and modifying one or more parameters of the test signals, the one or more parameters including time duration of the test signals, a frequency occupancy of the test signals, a time separation between test signals, a rate of injection of the test signals, and a transmit power level of the test signals.

4. The system of claim 1, wherein the logical processor in analyzing said down converted signal is capable of:
determining a time base of generation difference between the transmitted test signal and the facsimile test signal.

5. The system of claim 1, wherein the logical processor is further configured to determine information regarding a frequency offset between the test signal and the facsimile signal, and effect an adjustment in the frequency offset of the facsimile signal.

6. The system of claim 1, wherein the logical processor is further configured to determine information regarding a time offset between the test signal and the facsimile signal, and effect an adjustment of the start time of the facsimile signal based on the determined time offset between the test signal and the facsimile signal.

7. The system of claim 1, wherein the test signal injector is included in a test signal transmitter side of the system and wherein the test signal receiver is included in a test signal receiver side of the system, and wherein the test signal transmitter side and the test signal receiver side are separated by the communications propagation path;
wherein the signal processing circuit is included in the test signal receiver end and is configured to correct for effects of the multiple propagation paths on the received interlaced injected signals.

8. The system of claim 1, wherein the test signal injector is included in a test signal transmitter side of the system and wherein the test signal receiver is included in a test signal receiver side of the system, and wherein the test signal transmitter side and the test signal receiver side are separated by the communications propagation path;
wherein the signal processing circuit is included in the transmitter side and is configured to correct for effects of the propagation path on a signal received from the receiver side and transmitted over the communications propagation path.

9. The system of claim 1, further comprising:
a network interface; and
wherein the communications signal carries information received via the network interface.

10. The system of claim 1, wherein the communications signal carries control information generated by the system.

11. A method comprising:
a test signal injector which interlace test signals with communications signals, wherein one or more of the test signals is an FM sweep;
a transmitter which transmits said interlaced signals over wireless communications paths from a multiplicity of transmitting antennas;
receivers which receive said interlaced test signals by means of a multiplicity of antennas and determines measurements of amplitude versus frequency and phase shift versus frequency characteristics of the multiple propagation paths from each transmitting antenna to each receiving antenna; and
a signal processing circuit which use one or more of said measurements to correct for effects of the multiple propagation paths on the communications;
wherein test signal receivers comprise:
one or more signal generators producing facsimiles of the multiple transmitted test signals wherein said generators are adjustable and can have an initially unknown time offset from a transmitted test signal, an unknown frequency offset from a transmitted test signal, and an unknown time base of generation from a transmitted test signal;
a downconverter which uses facsimile signals to heterodyne said received test signals to obtain down-converted signals; and
a logical processor capable of analyzing said downconverted signals and providing control signals to said adjustable facsimile signal generators to remove the initially unknown time offset, the initially unknown frequency offset, and the initially unknown time base of generation between the transmitting antenna injected signal and the receiving antenna facsimile signal.

12. The method of claim 11 wherein each of the multiple test signal receivers comprise:
an adjustable signal generator which generates a facsimile of said injected test signal;
a downconverter which uses said facsimile signal to heterodyne said received test signals to obtain a down converted signal; and
a logical processor capable of analyzing said down converted signal and providing a control signal to said adjustable facsimile signal generator to adjust one or more parameters of said facsimile signal generator.

13. The method of claim 11, wherein the test signal injector is capable of setting and modifying one or more parameters of the test signals, the one or more parameters including time duration of the test signals, a frequency occupancy of the test signals, a time separation between test signals, a rate of injection of the test signals, and a transmit power level of the test signals.

14. The method of claim 11, wherein the logical processor in analyzing said down converted signal is capable of:
determining a time base of generation difference between the transmitted test signal and the facsimile test signal.

15. The method of claim 11, wherein the logical processor is further configured to determine information regarding a frequency offset between the test signal and the facsimile signal, and effect an adjustment in the frequency offset of the facsimile signal.

16. The method of claim 11, wherein the logical processor is further configured to determine information regarding a time offset between the test signal and the facsimile signal, and effect an adjustment of the start time of the facsimile signal based on the determined time offset between the test signal and the facsimile signal.

17. The method of claim 11, wherein the test signal injector is included in a test signal transmitter side of the system and wherein the test signal receiver is included in a test signal receiver side of the system, and wherein the test signal transmitter side and the test signal receiver side are separated by the communications propagation path;

wherein the signal processing circuit is included in the test signal receiver end and is configured to correct for effects of the multiple propagation paths on the received interlaced injected signals.

18. The method of claim 11, wherein the test signal injector is included in a test signal transmitter side of the system and wherein the test signal receiver is included in a test signal receiver side of the system, and wherein the test signal transmitter side and the test signal receiver side are separated by the communications propagation path;

wherein the signal processing circuit is included in the transmitter side and is configured to correct for effects of the propagation path on a signal received from the receiver side and transmitted over the communications propagation path.

19. The method of claim 11, further comprising:

a network interface; and wherein the communications signal carries information received via the network interface.

20. The method of claim 11, wherein the communications signal carries control information generated by the system.

* * * * *